(12) United States Patent
Araki

(10) Patent No.: US 8,855,478 B2
(45) Date of Patent: Oct. 7, 2014

(54) LENS BARREL

(71) Applicant: Panasonic Corporation, Osaka (JP)

(72) Inventor: Yoshiharu Araki, Saitama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/187,641

(22) Filed: Feb. 24, 2014

(65) Prior Publication Data

US 2014/0169779 A1    Jun. 19, 2014

Related U.S. Application Data

(63) Continuation of application No. PCT/JP2012/003857, filed on Jun. 13, 2012.

(30) Foreign Application Priority Data

Aug. 25, 2011   (JP) .................................. 2011-184076

(51) Int. Cl.
| | | |
|---|---|---|
| *G03B 17/04* | (2006.01) | |
| *G03B 5/02* | (2006.01) | |
| *H04N 5/262* | (2006.01) | |
| *G02B 15/14* | (2006.01) | |
| *G02B 7/10* | (2006.01) | |
| *G03B 17/14* | (2006.01) | |
| *G03B 5/00* | (2006.01) | |

(52) U.S. Cl.
CPC ... *G02B 7/10* (2013.01); *G02B 7/102* (2013.01); *G02B 15/14* (2013.01); *G03B 17/14* (2013.01); *G03B 5/00* (2013.01)
USPC .......... 396/85; 396/349; 348/240.3; 359/699; 359/700

(58) Field of Classification Search
USPC ............ 396/85, 348, 349; 348/240.99, 240.3; 359/676, 701, 694, 699, 700
See application file for complete search history.

(56) References Cited

U.S. PATENT DOCUMENTS 5,386,740 A    2/1995 Nomura et al.

FOREIGN PATENT DOCUMENTS

| JP | 05-093834 | 4/1993 |
|---|---|---|
| JP | 09-281375 | 10/1997 |
| JP | 2006-227213 | 8/2006 |
| JP | 2010-186192 | 8/2010 |
| JP | 2010-190986 | 9/2010 |
| JP | 2010-204563 | 9/2010 |
| JP | 2011-007906 | 1/2011 |

OTHER PUBLICATIONS

International Search Report for corresponding International Application No. PCT/JP2012/003857 mailed on Jul. 10, 2012.
Form PCT/ISA/237 for corresponding International Application No. PCT/JP2012/003857 dated Jul. 10, 2012.

*Primary Examiner* — Rochelle-Ann J Blackman
(74) *Attorney, Agent, or Firm* — Renner, Otto, Boisselle & Sklar, LLP

(57) ABSTRACT

At an inner circumferential surface of a cam frame, second cam grooves and an inner gear are formed. A second lens group frame includes a base, extensions each extending from the base in an optical axis direction, and cam pins each outwardly protruding from a tip end part of a corresponding one of the extensions in a radial direction. In the extension, a stepped part is formed. The stepped part overlaps, when each cam pin moves according to a corresponding one of the second cam grooves, with the inner gear as viewed in the radial direction, and is recessed toward the inside in the radial direction as compared to a tooth tip of the inner gear so as not to overlap with the tooth tip of the inner gear as viewed in a circumferential direction.

3 Claims, 18 Drawing Sheets

ID: 8,855,478 B2

LENS BARREL

CROSS-REFERENCE TO RELATED APPLICATIONS

This is a continuation of International Application No. PCT/JP2012/003857 filed on Jun. 13, 2012, which claims priority to Japanese Patent Application No. 2011-184076 filed on Aug. 25, 2011. The entire disclosures of these applications are incorporated by reference herein.

BACKGROUND

The technique disclosed herein relates to a lens barrel.

Conventionally, a lens barrel has been configured such that a frame-shaped member or a cylindrical member configured to directly or indirectly hold a lens(es) moves in an optical axis direction to move the lens(es) in the optical axis direction.

In each of lens barrels described in Japanese Unexamined Patent Publication No. 2010-186192 and Japanese Unexamined Patent Publication No. 2010-204563, a gear part is formed at a rear end of an outer circumferential surface of a drive frame formed with cam grooves. The gear part of the drive frame is engaged with a drive gear of a fixed frame. In such a state, when a zoom motor is operated, drive force of the zoom motor is transmitted to the gear part of the drive frame through the drive gear. As a result, the drive frame is rotatably driven. While the drive frame is rotating relative to the fixed frame and is moving in an optical axis direction, a lens(es) is moving in the optical axis direction.

SUMMARY

However, in each of the lens barrels described in Japanese Unexamined Patent Publication No. 2010-186192 and Japanese Unexamined Patent Publication No. 2010-204563, a gear serving as the gear part is formed at the outer circumferential surface of the drive frame, and therefore a drive gear of the zoom motor should be disposed outside the drive frame in a radial direction. In this configuration, the outer diameter of the lens barrel increases, and it is difficult to reduce the size of the lens barrel.

The technique disclosed herein has been made in view of the foregoing, and aims to devise arrangement of a gear of a cam frame to provide a lens barrel having a reduced size.

A lens barrel disclosed herein is a lens barrel in which a lens is movable in an optical axis direction. The lens barrel includes a cylindrical cam frame formed, at an inner circumferential surface thereof, with a cam groove extending in a predetermined pattern, and an inner gear inwardly protruding in a radial direction and extending in a circumferential direction; and a lens frame including a base configured to hold the lens inside the cam frame, an extension extending from the base in the optical axis direction, and a cam pin outwardly protruding from a tip end part of the extension in the radial direction and fitted into the cam groove. A stepped part which, when the cam pin moves according to the cam groove, overlaps with the inner gear as viewed in the radial direction and is recessed toward an inside in the radial direction as compared to a tooth tip of the inner gear so as not to contact the inner gear is provided in the extension.

According to the lens barrel, since the inner gear is formed on the inner circumferential side of the cam frame, the size of the lens barrel can be reduced as compared to the case where the gear is formed at the outer circumferential surface of the cam frame. Moreover, since the inner gear does not contact the extension of the lens frame when the cam pin moves according to the cam groove, the lens frame can smoothly move in the optical axis direction.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

An example embodiment will be described in detail below with reference to drawings.

1. Schematic Configuration of Imaging Apparatus

Figure 1:
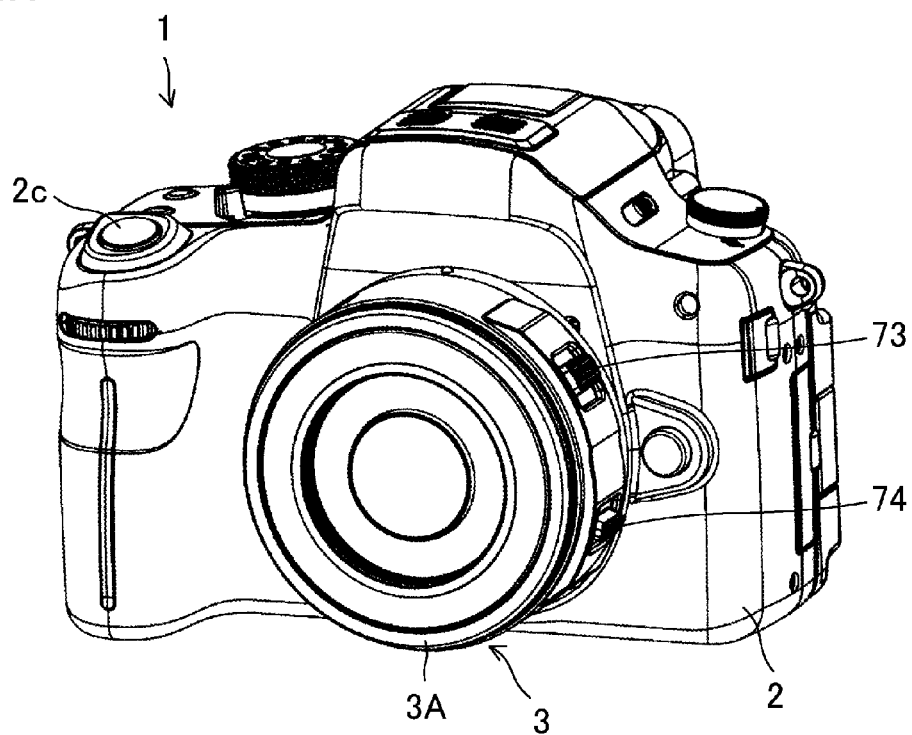
FIG. 1 is a perspective view of an imaging apparatus of an embodiment.

FIG. 1 is a perspective view of an imaging apparatus 1. The imaging apparatus 1 is a digital camera with interchangeable lenses. The imaging apparatus 1 includes a camera body 2 and a lens barrel 3 detachably attached to the camera body 2. In the present embodiment, a side close to an object in an optical axis direction of the lens barrel 3 is, for the sake of simplicity, referred to as a "front," and a side close to the camera body in the optical axis direction is referred to as a "rear." Moreover, a right side as viewed from the side close to the object in the optical axis direction is referred to as a "right," and a left side as viewed from the side close to the object in the optical axis direction is referred to as a "left." Unless otherwise described, a "circumferential direction" means a circumferential direction about an optical axis, and a "radial direction" means a radial direction about the optical axis.

Figure 2:
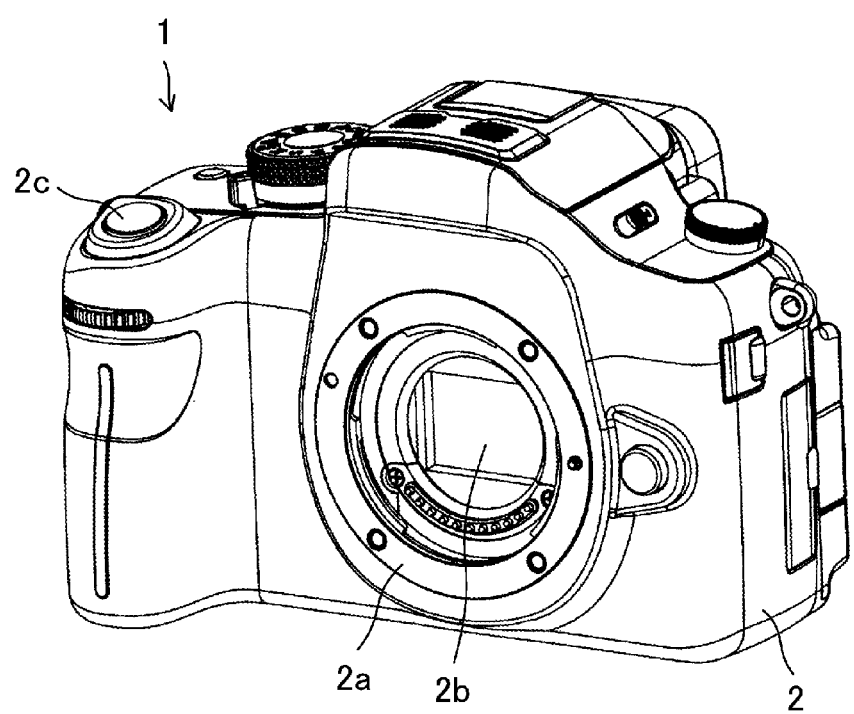
FIG. 2 is a perspective view of a camera body from which a lens barrel is detached.

FIG. 2 is a perspective view of the camera body 2 from which the lens barrel 3 is detached. The camera body 2 includes a body mount 2a to which the lens barrel 3 is attached, an imaging device 2b configured to capture an optical image formed by the lens barrel 3 to convert the optical image into image data, and a shutter button 2c. The shutter button 2c is provided on an upper left end part of the camera body 2.

2-1. Configuration of Lens Barrel

Figure 3:
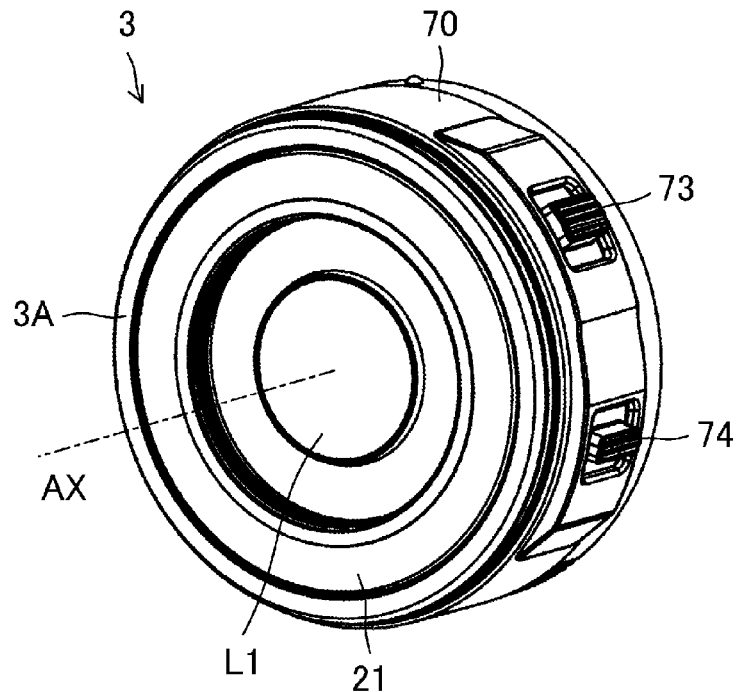
FIG. 3 is an oblique perspective view of the lens barrel from the front.
Figure 4:
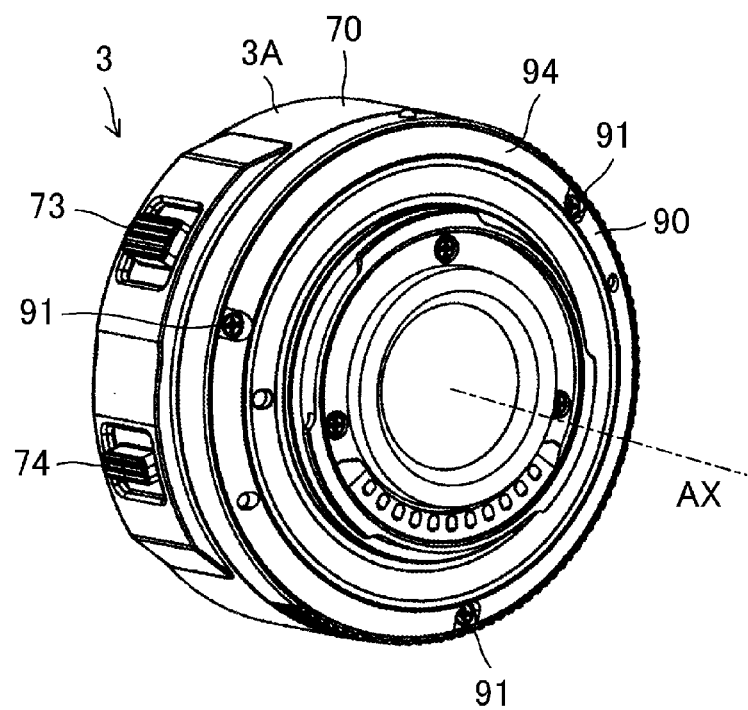
FIG. 4 is an oblique perspective view of the lens barrel from the rear.
Figure 5:
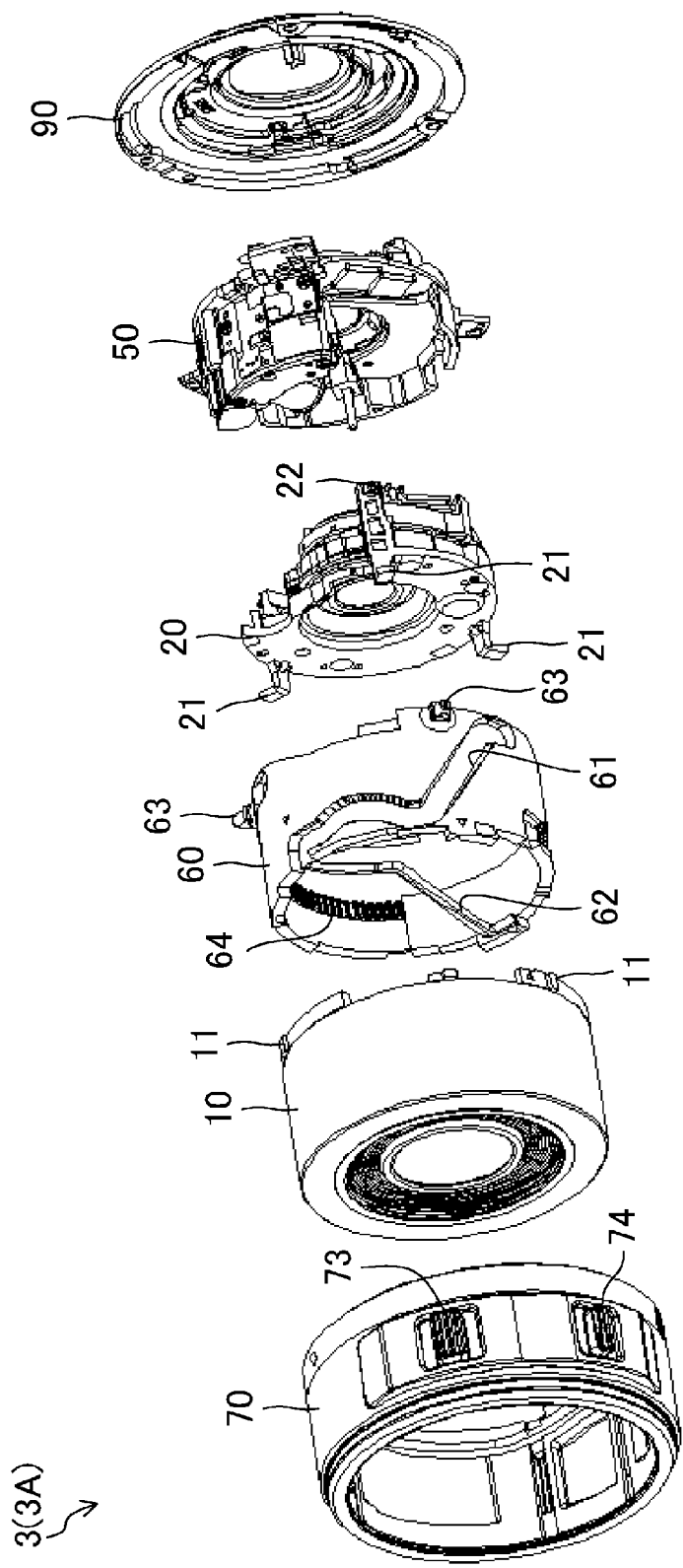
FIG. 5 is an exploded perspective view of the lens barrel.
Figure 6:
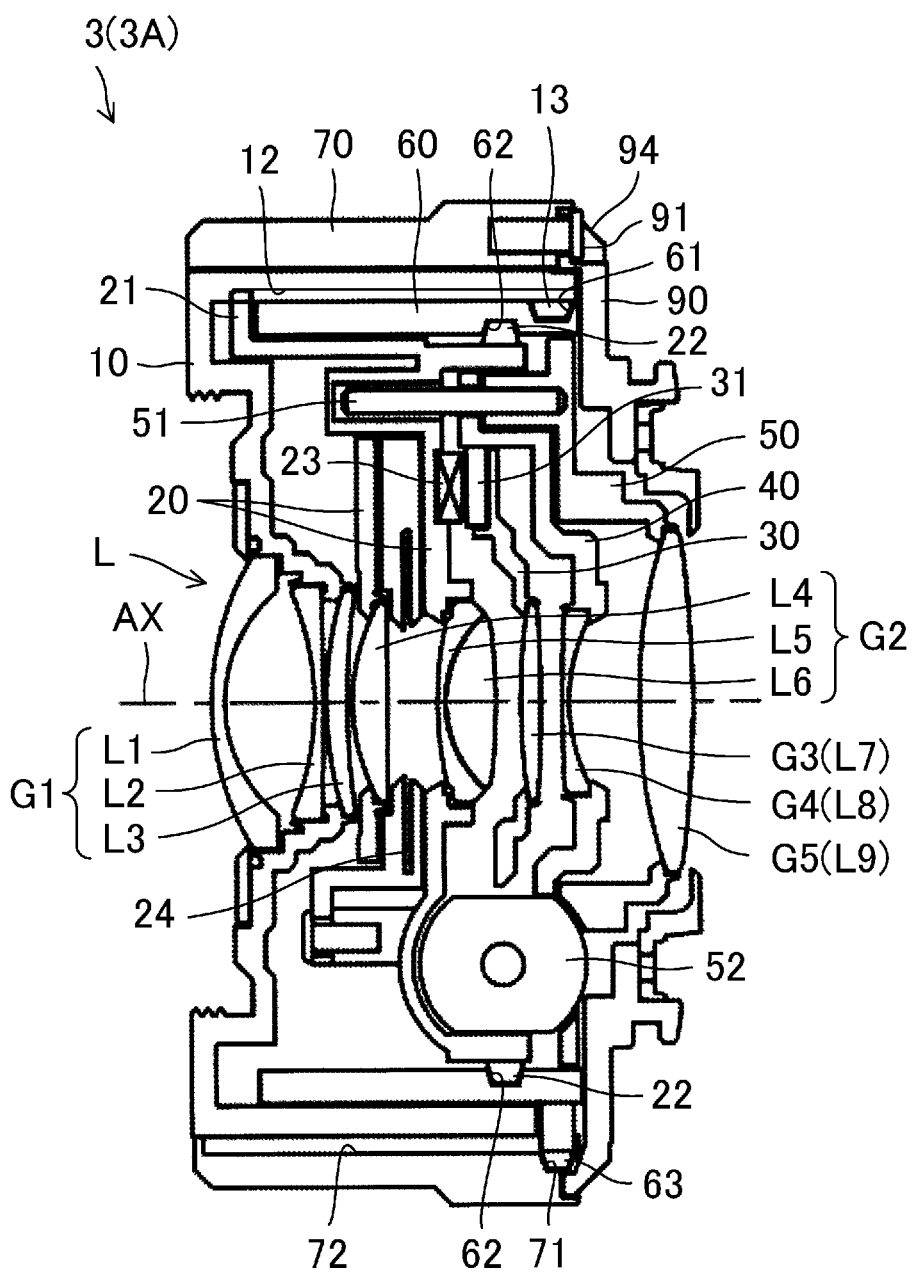
FIG. 6 is a longitudinal sectional view of the lens barrel in a collapsed state.
Figure 7:
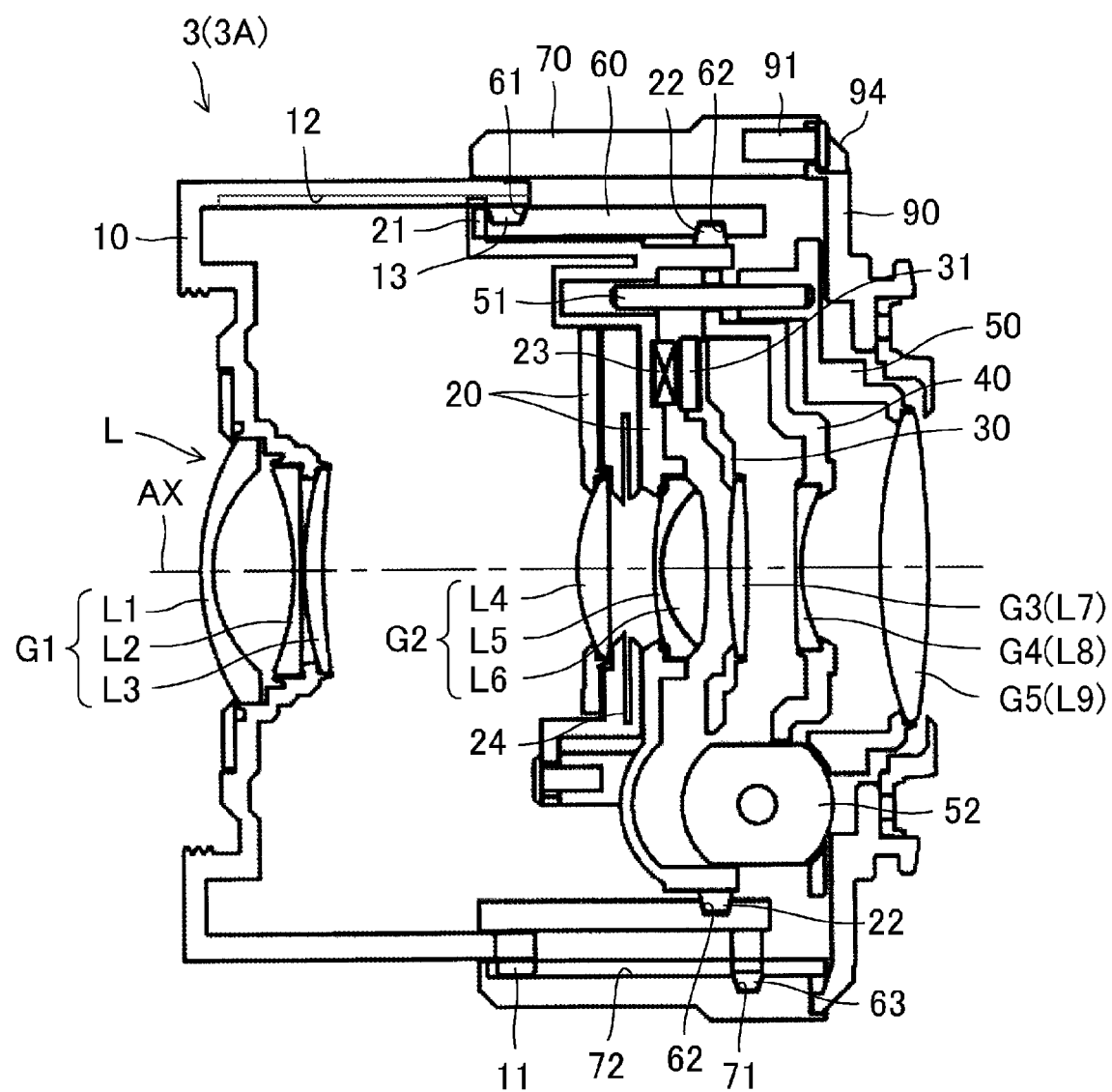
FIG. 7 is a longitudinal sectional view of the lens barrel at a wide-angle end thereof.
Figure 8:
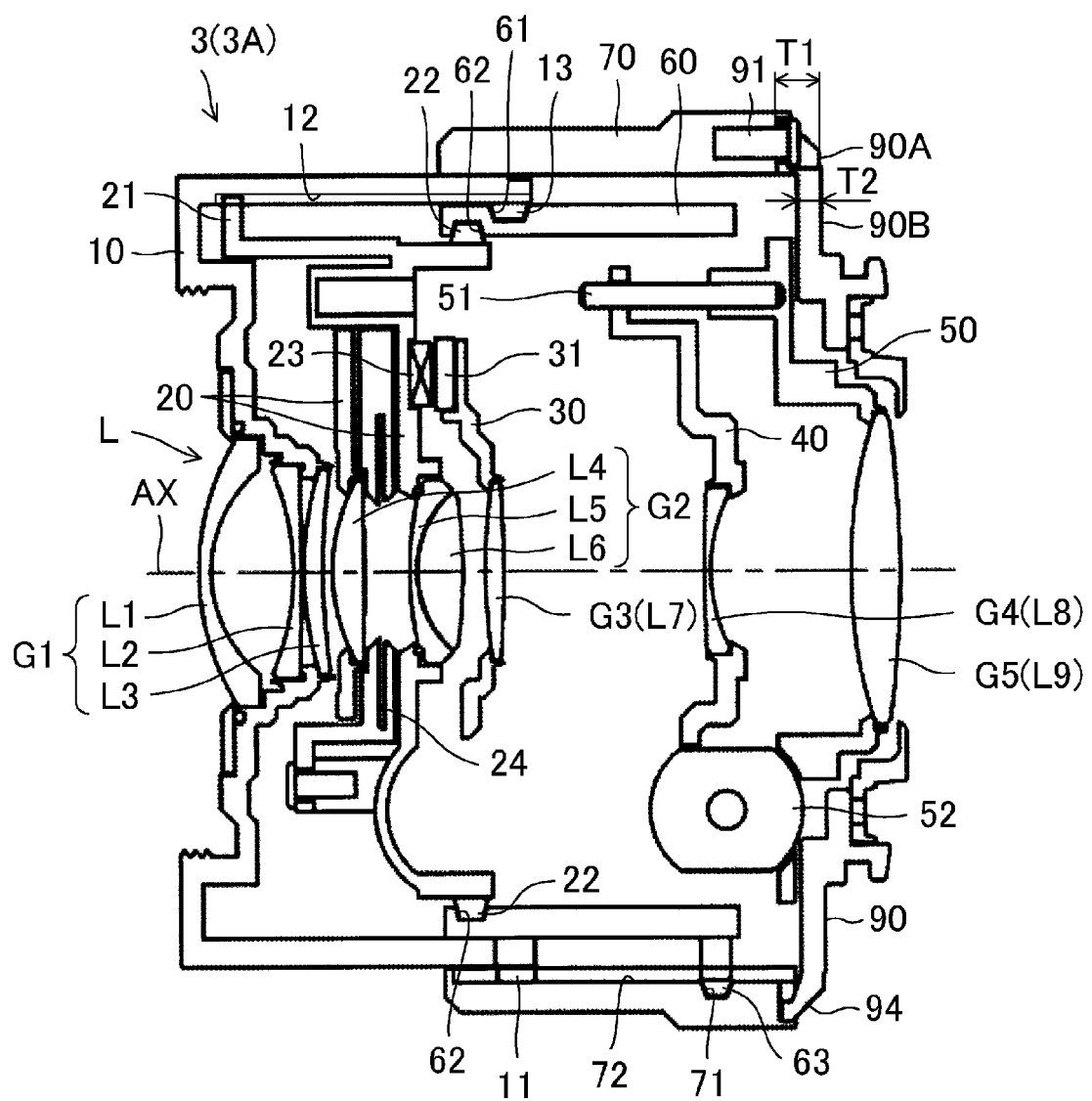
FIG. 8 is a longitudinal sectional view of the lens barrel at a telephoto end thereof.

FIG. 3 is an oblique perspective view of the lens barrel 3 from the front. FIG. 4 is an oblique perspective view of the lens barrel 3 from the rear. FIG. 5 is an exploded perspective view of the lens barrel 3. FIG. 6 is a longitudinal sectional view of the lens barrel 3 in a collapsed state. FIG. 7 is a longitudinal sectional view of the lens barrel 3 at a wide-angle end thereof. FIG. 8 is a longitudinal sectional view of the lens barrel 3 at a telephoto end thereof.

The lens barrel 3 is a collapsible zoom lens barrel. Referring to FIG. 3, the lens barrel 3 includes a barrel body 3A, a zoom lever switch 73, and a focus lever switch 74. The zoom lever switch 73 and the focus lever switch are provided on the barrel body 3A. The zoom lever switch 73 is an operation section operated by a user to adjust the magnification of an optical system L, and serves as a "zoom operation section" configured to transmit a user's operation instruction to a zoom adjustment mechanism which will be described later. The focus lever switch 74 is an operation section operated by the user to adjust the focus of the optical system L, and serves as a "focus operation section" configured to transmit a user's operation instruction to a focus adjustment mechanism which will be described later. Although will be described in detail later, a bayonet lens mount 90 is, referring to FIG. 4, provided at a rear end of the lens barrel 3. The lens barrel 3 is mechanically and electrically connected to the camera body 2 through the lens mount 90 and the body mount 2a.

Referring to FIG. 5, the barrel body 3A includes the optical system L (see FIGS. 6-8) including a plurality of lenses, a plurality of lens frames 10-50 each configured to hold the lens(es), a cam frame 60 configured to transmit drive force to the lens frames 10-50, an outer frame 70 in which the lens frames 10-50 and the cam frame 60 are housed, a printed circuit board 80 (illustrated only in FIG. 12), and the lens mount 90.

Specifically, the optical system L is, referring to FIGS. 6-8, a zoom lens system configured to form an optical image of the object, and includes first to fifth lens groups G1-G5. The first lens group G1 includes first to third lenses L1-L3. The second lens group G2 includes fourth to sixth lenses L4-L6. The third lens group G3 includes a seventh lens L7. The lenses of the first to third lens groups G1-G3 are zoom lenses. The lens of the third lens group G3 also functions as a lens for image blur correction. The fourth lens group G4 includes an eighth lens L8. The lens of the fourth lens group G4 is a focus lens. The fifth lens group G5 includes a ninth lens L9.

The outer frame 70 is a cylindrical component. A plurality of cam grooves 71 each extending in a predetermined pattern and a plurality of translational grooves 72 each extending in the optical axis direction are formed at an inner circumferential surface of the outer frame 70. The outer frame 70 serves as an exterior part of the lens barrel 3 exposed to the outside.

In the printed circuit board 80, at least a lens microcomputer (not shown in the figure) and a memory (not shown in the figure) are provided. Electric components of the lens barrel 3 are electrically connected to the printed circuit board 80 through flexible printed circuit boards. The printed circuit board 80 is also electrically connected to a mount contact (not shown in the figure) provided in the lens mount 90. That is, the printed circuit board 80 is electrically connected to the camera body 2 when the lens barrel 3 is attached to the camera body 2. The printed circuit board 80 is disposed between the fifth lens group frame 50 and the lens mount 90.

The lens mount 90 is a circular component formed with an opening at the center thereof, and is attachable to the body mount 2a. The position of the lens barrel 3 relative to the camera body 2 is determined with the lens mount 90 contacting the camera body 2. The lens mount 90 is attached to a rear end surface of the outer frame 70 through screws 91.

The cam frame 60 is a cylindrical component. A plurality of first cam grooves 61 each extending in a predetermined pattern and a plurality of cam pins 63 each outwardly protruding from a rear end part of the cam frame 60 are formed at an outer circumferential surface of the cam frame 60. Moreover, a plurality of second cam grooves 62 each extending in a predetermined pattern and an inner gear 64 (see FIG. 5) are formed at an inner circumferential surface of the cam frame 60. The inner gear 64 is formed between adjacent ones of the second cam grooves 62 so as to extend in the circumferential direction.

The first lens group frame 10 is a cylindrical component, and is configured to hold the first lens group G1. A plurality of protrusions 11 each outwardly protruding from a rear end part of the first lens group frame 10 are formed at an outer circumferential surface of the first lens group frame 10. A plurality of translational grooves 12 each extending in the optical axis direction and a plurality of cam pins 13 each inwardly protruding from the rear end part of the first lens group frame 10 are formed at an inner circumferential surface of the first lens group frame 10.

The second lens group frame 20 is a circular component formed with an opening at the center thereof, and is configured to hold the second lens group G2 at the opening of the second lens group frame 20. In the second lens group frame 20, a plurality of protrusions 21 each outwardly protruding from a front end part of the second lens group frame 20 and a plurality of cam pins 22 each outwardly protruding from a rear end part of the second lens group frame 20 are provided. In the second lens group frame 20, two coils 23 are provided respectively at positions each facing a corresponding one of two magnets 31 (described later) of the third lens group frame 30. A diaphragm mechanism 24 is provided in the second lens group frame 20.

The third lens group frame 30 is a circular component formed with an opening at the center thereof, and is configured to hold the third lens group G3 at the opening of the third lens group frame 30. The third lens group frame 30 is held at a rear surface of the second lens group frame 20 so as to move in a plane perpendicular to an optical axis AX. The two magnets 31 are provided in the third lens group frame 30. The third lens group frame 30 is driven by magnetic force generated by the coils 23 of the second lens group frame 20 to move in the plane perpendicular to the optical axis AX.

The first and third lens group frames 10-30 and the cam frame 60 are integrally incorporated into the outer frame 70. Specifically, the cam frame 60 is housed in the first lens group frame 10. In such a state, each cam pin 13 of the first lens group frame 10 is fitted into a corresponding one of the first cam grooves 61 of the cam frame 60. Moreover, each cam pin 63 of the cam frame 60 outwardly protrudes relative to the first lens group frame 10 at the rear of the first lens group frame 10. The second lens group frame 20 is housed in the cam frame 60. In such a state, each cam pin 22 is fitted into a corresponding one of the second cam grooves 62 of the cam frame 60. Each protrusion 21 outwardly protrudes relative to the cam frame 60 at the front of the cam frame 60, and is fitted into a corresponding one of the translational grooves 12 of the first lens group frame 10. The first lens group frame 10 is housed in the outer frame 70. In such a state, each protrusion 11 is fitted into a corresponding one of the translational grooves 72 of the outer frame 70. Moreover, each cam pin 63 of the cam frame 60 outwardly protruding relative to the first lens group frame 10 is fitted into a corresponding one of the cam grooves 71 of the outer frame 70.

The fifth lens group frame 50 is a circular component formed with an opening at the center thereof, and is configured to hold the fifth lens group G5 at the opening of the fifth lens group frame 50. The fifth lens group frame 50 is, at a rear end surface thereof, attached to the outer frame 70 through screws. Two shafts 51 each extending toward the front in the optical axis direction inside the outer frame 70 are provided in the fifth lens group frame 50. In the fifth lens group frame 50, a zoom motor 52 configured to drive the cam frame 60 and a focus motor 53 (see FIGS. 18 and 19) configured to drive the fourth lens group frame 40 are provided.

A lead screw extending in the optical axis direction is provided in an output shaft of the focus motor 53. A drive gear 52a (see FIGS. 18 and 19) rotating about a rotation axis extending in the optical axis direction is connected to an output shaft of the zoom motor 52 through a gear train. The drive gear 52a is engaged with the inner gear 64 of the cam frame 60. That is, the cam frame 60 is rotatably driven by the zoom motor 52. The zoom motor 52 and the cam frame 60 form the "zoom adjustment mechanism" configured to adjust the magnification of the optical system L.

The fourth lens group frame 40 is a circular component formed with an opening at the center thereof, and is configured to hold the fourth lens group G4 at the opening of the fourth lens group frame 40. The fourth lens group frame 40 is supported through the shafts 51 provided in the fifth lens group frame 50 so as to move in the optical axis direction. A rack is provided in the fourth lens group frame 40, and is engaged with the lead screw of the focus motor 53. That is, the fourth lens group frame 40 is driven by the focus motor 53.

The focus motor 53 and the fourth lens group frame 40 form the "focus adjustment mechanism" configured to adjust the focus of the optical system L.

2-2. Operation of Lens Barrel

In the lens barrel 3 configured as described above, the zoom motor 52 rotatably drives the cam frame 60. The rotatably-driven cam frame 60 rotates while moving in the optical axis direction according to the cam grooves 71 of the outer frame 70. Each cam pin 13 of the first lens group frame 10 is fitted into a corresponding one of the first cam grooves 61 of the cam frame 60, and each protrusion 11 of the first lens group frame 10 is fitted into a corresponding one of the translational grooves 72 of the outer frame 70 such that the first lens group frame 10 does not rotate relative to the outer frame 70. Thus, rotation of the cam frame 60 allows the first lens group frame 10 to move, without rotation, in the optical axis direction in accordance with movement of each cam pin 13 relative to a corresponding one of the first cam grooves 61. Each cam pin 22 of the second lens group frame 20 is fitted into a corresponding one of the second cam grooves 62 of the cam frame 60, and each protrusion 21 of the second lens group frame 20 is fitted into a corresponding one of the translational grooves 12 of the first lens group frame 10 such that the second lens group frame 20 does not rotate relative to the first lens group frame 10. Thus, rotation of the cam frame 60 allows the second lens group frame 20 to move, without rotation, in the optical axis direction in accordance with movement of each cam pin 22 relative to a corresponding one of the second cam grooves 62. The third lens group frame 30 moves with the second lens group frame 20 in the optical axis direction. The first to third lens group frames 10-30 move in the optical axis direction in this manner, thereby adjusting the magnification of the optical system L of the lens barrel 3. The third lens group frame 30 is driven by the coils 23 to move in the plane perpendicular to the optical axis AX, thereby correcting an image blur. The fourth lens group frame 40 is, independently of the first to third lens group frames 10-30, driven by the focus motor 53 to move in the optical axis direction. In this manner, the focus of the lens barrel 3 is adjusted.

More specifically, when the lens barrel 3 is powered off, the first to third lens group frames 10-30 are at a collapsed position illustrated in FIG. 6. When the lens barrel 3 is powered on, the first to third lens group frames 10-30 move from the collapsed position to the wide-angle end illustrated in FIG. 7. Then, when the user operates the zoom lever switch 73, a signal corresponding to an operation amount is input to the lens microcomputer of the printed circuit board 80. The lens microcomputer outputs a drive signal corresponding to the input signal to the zoom motor 52. The zoom motor 52 is operated in response to the drive signal to rotatably drive the cam frame 60. As a result, the first to third lens group frames 10-30 move in the optical axis direction between the wide-angle end and the telephoto end illustrated in FIG. 8. In this manner, zoom magnification is manually adjusted.

In such a state, the fourth lens group frame 40 is driven in tandem with the first to third lens group frames 10-30. Specifically, the lens microcomputer moves, based on a pre-stored tracking table, the fourth lens group frame 40 to the position at which a focus state can be maintained before and after a change in magnification of the optical system L. That is, upon receipt of the input signal, the lens microcomputer outputs the drive signal not only to the zoom motor 52, but also to the focus motor 53. As a result, the fourth lens group frame 40 moves corresponding to the first to third lens group frames 10-30. Note that the user can operate the focus lever switch 74 to manually adjust the position of the fourth lens group frame 40. Specifically, when the focus lever switch 74 is operated, a signal corresponding to an operation amount is input to the lens microcomputer of the printed circuit board 80. The lens microcomputer outputs a drive signal corresponding to the input signal to the focus motor 53. The focus motor 53 is operated in response to the drive signal to move the fourth lens group frame 40 in the optical axis direction. In this manner, the focus state is manually adjusted.

2-3. Specific Configuration of Lens Mount

Figure 9:
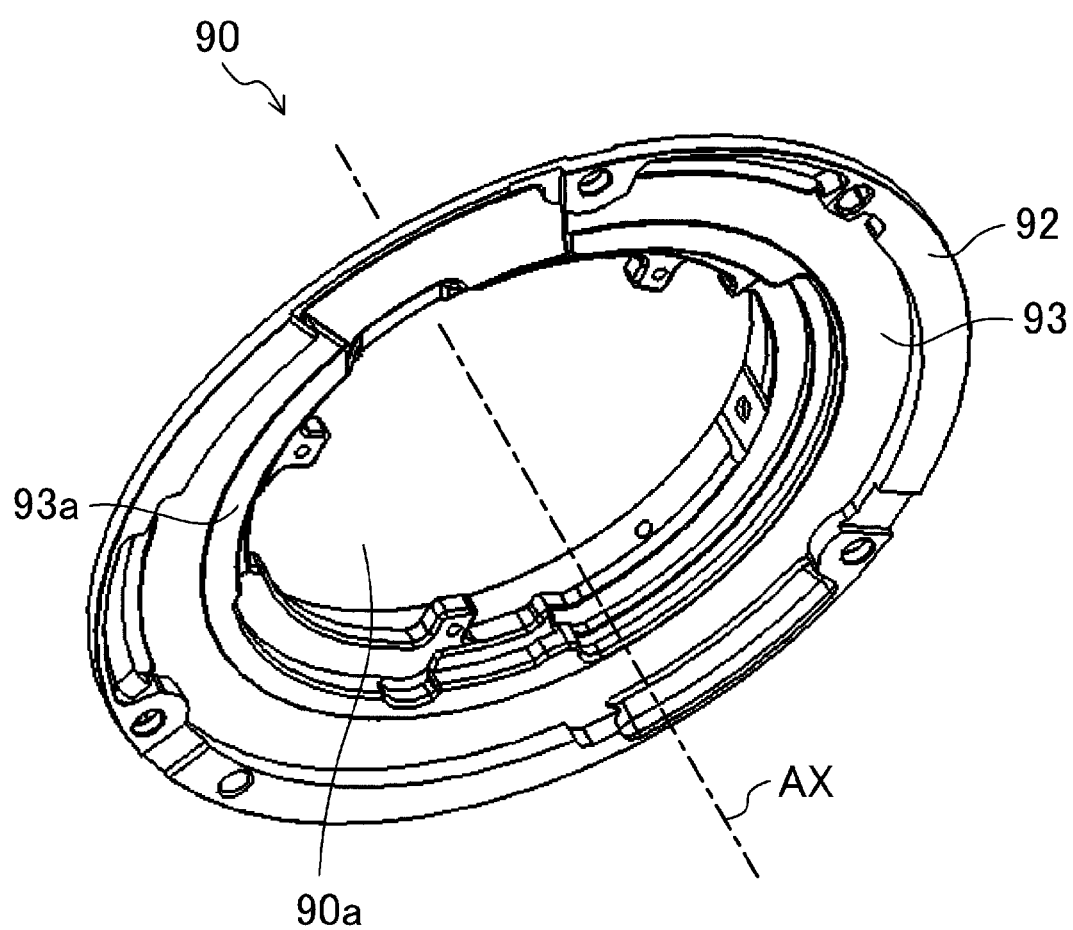
FIG. 9 is a perspective view of a lens mount.

FIG. 9 is a perspective view of the lens mount 90.

First, the configuration of the lens mount 90 at a front surface thereof will be described. The lens mount 90 is, at the front surface thereof, in a stepped shape formed of an attachment surface 92 which is formed at a circumferential edge of the lens mount 90 and a recessed part 93 which is part of the lens mount 90 inside the attachment surface 92 in the radial direction and which is recessed toward the rear. The attachment surface 92 is for attachment of the outer frame 70, and the lens mount 90 is screwed to the outer frame 70 with the attachment surface 92 contacting the rear end surface of the outer frame 70. The recessed part 93 is part of the lens mount 90 facing a rear end surface of the first lens group frame 10 and a rear end surface of the cam frame 60. In the collapsed state, the rear end parts of the first lens group frame 10 and the cam frame 60 are positioned on the rear side relative to the attachment surface 92, and enter the recessed part 93. Note that, even in the collapsed state in which the first lens group frame 10 and the cam frame 60 are at the rearmost position, the rear end surfaces of the first lens group frame 10 and the cam frame 60 do not contact the recessed part 93. At a circumferential part of the recessed part 93 on the inside in the radial direction, a protrusion 93a slightly projecting toward the front than the other part of the recessed part 93 is formed. The protrusion 93a does not face the rear end surfaces of the first lens group frame 10 and the cam frame 60, and is positioned inside such rear end surfaces in the radial direction. Part of the lens mount 90 inside the recessed part 93 in the radial direction is further recessed toward the rear, and a plurality of steps are formed in such a part. An opening 90a is formed at the center of the lens mount 90.

Referring to FIGS. 4 and 6-8, the lens mount 90 is, at part of a rear surface corresponding to the attachment surface 92 and the recessed part 93, not in a stepped shape, but forms a tapered surface 94. Thus, the thickness T1 of part 90A of the attachment surface 92 of the lens mount 90 is, in part, greater than the thickness T2 of part 90B of the recessed part 93. Note that insertion holes into each of which a corresponding one of the screws 91 is inserted are formed in the lens mount 90, and a counterbore is formed at part of the tapered surface 94 corresponding to each insertion hole. Although the tapered surface 94 is formed in this example, the tapered surface 94 is not necessarily formed. In such a case, the thickness of the entirety of the part 90A of the attachment surface 92 is greater than that of the part 90B of the recessed part 93.

3. Specific Configuration of Lever Switch

Figure 10:
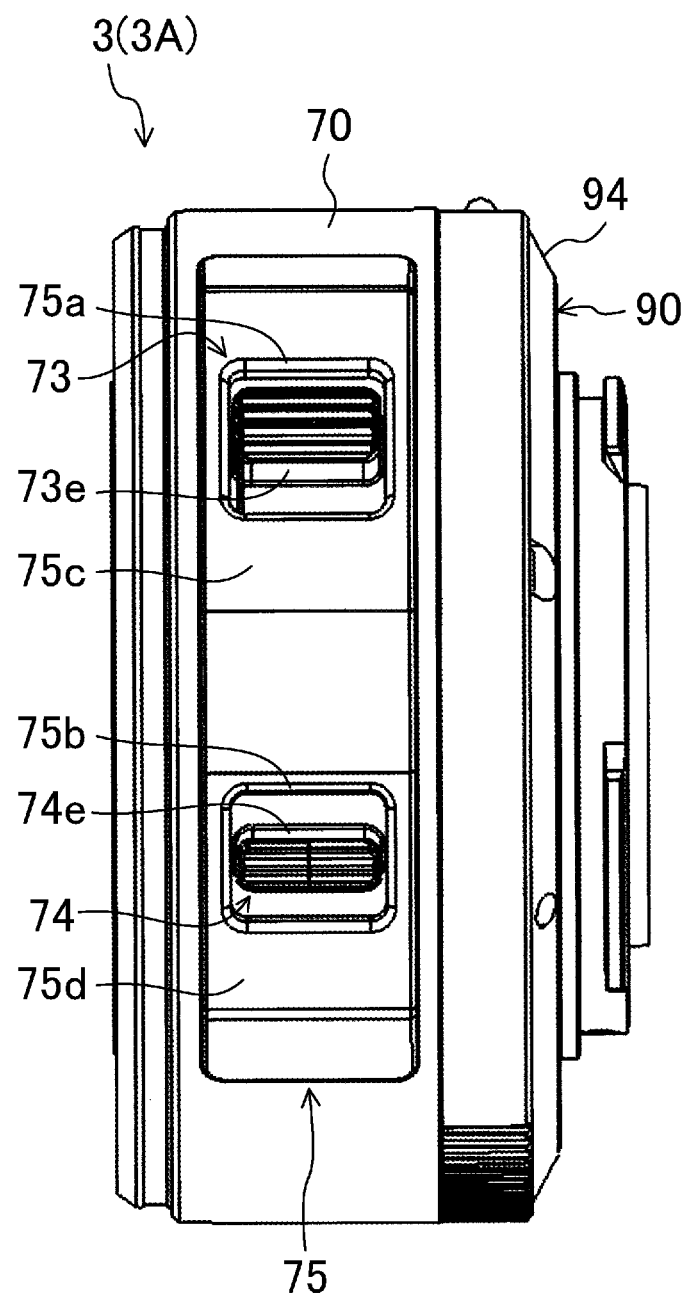
FIG. 10 is a side view of the lens barrel.
Figure 11:
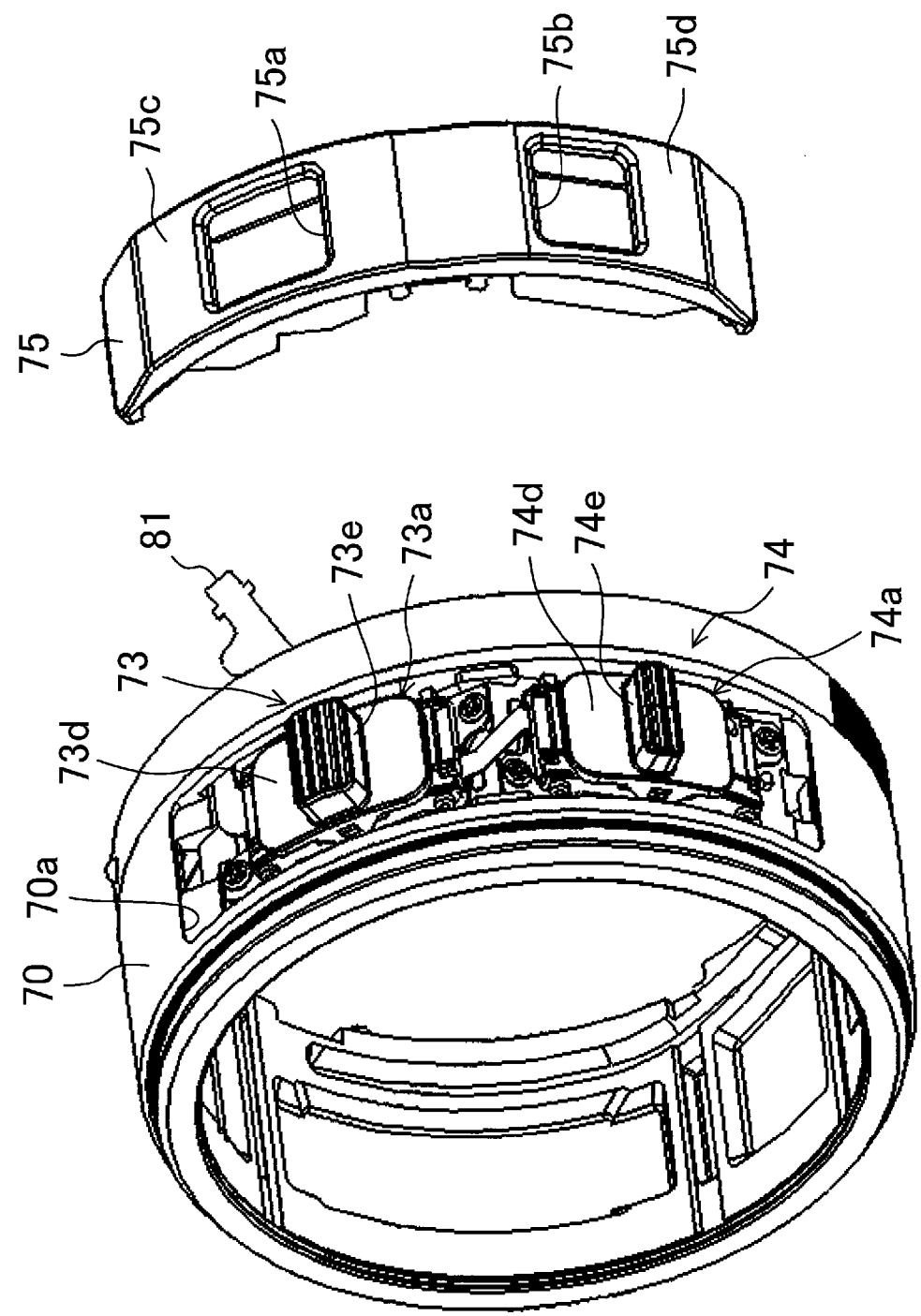
FIG. 11 is an exploded perspective view of an outer frame.
Figure 12:
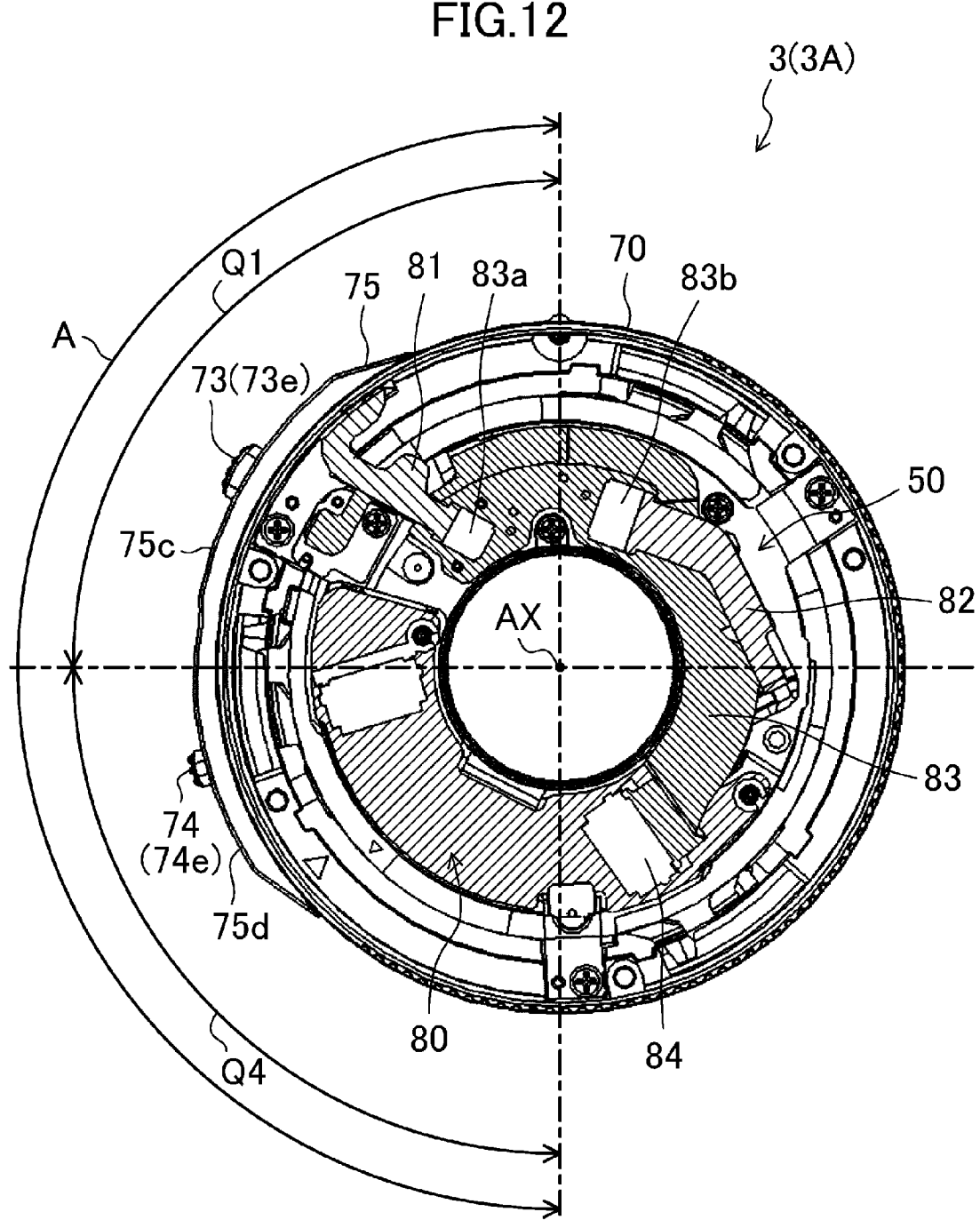
FIG. 12 is a rear view of the lens barrel in the state in which the lens mount is detached.
Figure 13:
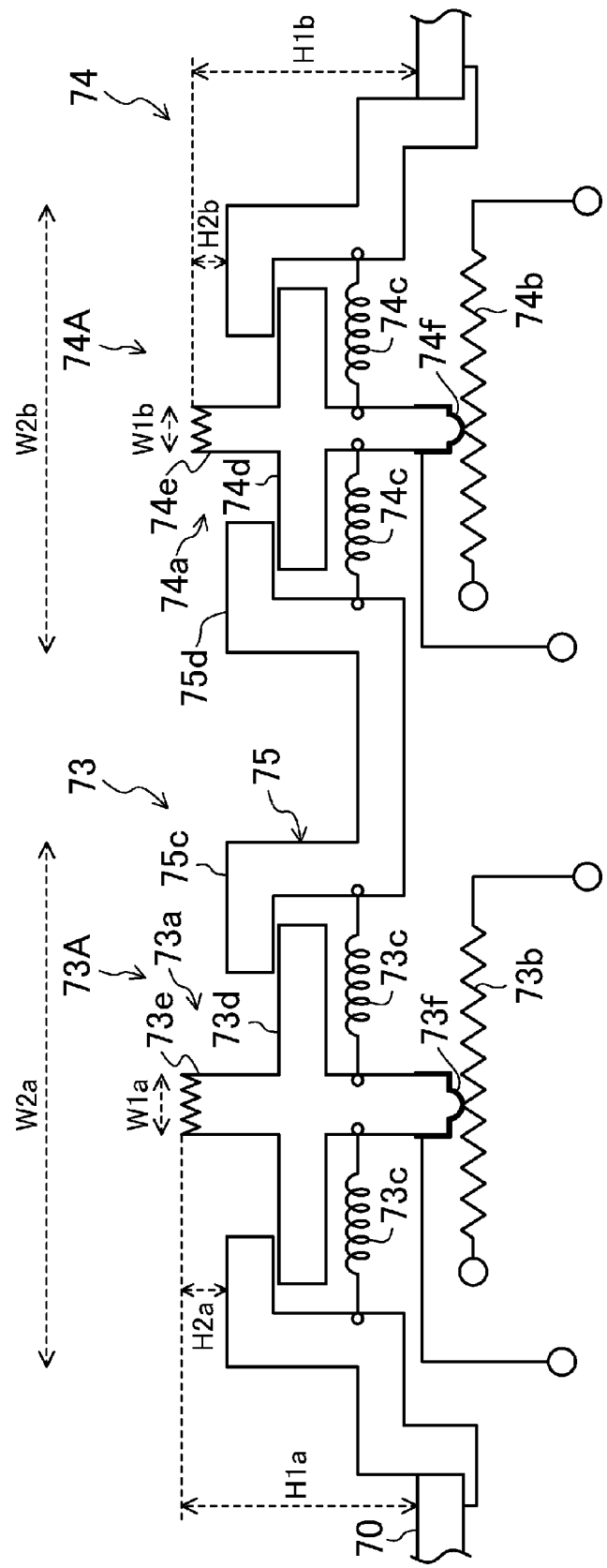
FIG. 13 is a schematic view illustrating the configuration of a zoom lever switch.

The specific configuration of the zoom lever switch 73 and the focus lever switch 74 will be described below. FIG. 10 is a side view of the lens barrel 3. FIG. 11 is an exploded perspective view of the outer frame 70. FIG. 12 is a rear view of the lens barrel 3 in the state in which the lens mount 90 is detached. FIG. 13 is a schematic view illustrating the configuration of the zoom lever switch 73 and the focus lever switch 74.

The zoom lever switch 73 and the focus lever switch 74 are arranged on an outer circumferential surface of the outer frame 70. A rectangular opening 70a is formed at the outer circumferential surface of the outer frame 70, and the zoom lever switch 73 and the focus lever switch 74 are arranged inside the opening 70a.

The zoom lever switch 73 and the focus lever switch 74 are arranged in the circumferential direction about the optical axis AX. The arrangement in the circumferential direction means that the positions in the circumferential direction about the optical axis AX are different from each other and the positions in the optical axis direction at least partially overlap with each other. In other words, the zoom lever switch 73 and the focus lever switch 74 are provided on the same circle. In the present embodiment, the positions of the zoom lever switch 73 and the focus lever switch 74 in the circumferential direction are different from each other, and the positions of the zoom lever switch 73 and the focus lever switch 74 in the optical axis direction are completely coincident with each other.

Specifically, the zoom lever switch 73 and the focus lever switch 74 are, referring to FIG. 12, arranged within an arrangement region A of the outer frame 70. The arrangement region A is a region on the right relative to the optical axis AX as viewed from the side close to the object in the optical axis direction, i.e., a region formed of a first quadrant Q1 and a fourth quadrant Q4 of the outer frame 70. Suppose that the lens barrel 3 attached to the camera body 2 in a horizontal attitude is, as viewed from the side close to object in the optical axis direction, divided into four regions by vertical and horizontal axes perpendicular to the optical axis AX. An upper right region is a first quadrant, an upper left region is a second quadrant, a lower left region is a third quadrant, and a lower right region is a fourth quadrant. The "horizontal attitude" means the attitude or state in which a horizontally-long image can be shot by the camera body 2. On the other hand, the attitude or state in which a vertically-long image can be shot by the camera body 2 is referred to as a "vertical attitude." More specifically, the zoom lever switch 73 is disposed in the first quadrant Q1, and the focus lever switch 74 is disposed in the fourth quadrant Q4. In the state in which the switch is disposed in a certain region such as the arrangement region A, the first quadrant Q1, or the fourth quadrant Q4, at least part of the switch may be within such a region, and the entirety of the switch is not necessarily positioned within the region.

Referring to FIG. 13, the zoom lever switch 73 is a momentary (i.e., self-restoring) switch, and includes a switch body 73A and a zoom switch support 75c.

The switch body 73A includes a lever 73a, a resistor member 73b, and two springs 73c. The lever 73a includes a plate-shaped lever base 73d extending in the circumferential direction about the optical axis AX, an operating section 73e outwardly protruding from the lever base 73d in the radial direction, and a contact 73f inwardly protruding from the lever base 73d in the radial direction. Part of the lever 73a other than the contact 73f is made of resin. The contact 73f is made of a conductive material. A tip end surface of the operating section 73e is in a substantially rectangular shape. Knurls are formed at the tip end surface of the operating section 73e. The lever 73a is supported by the outer frame 70 so as to slide in the circumferential direction. The lever 73a is biased toward one side in the circumferential direction by one of the springs 73c, and is biased toward the other side in the circumferential direction by the other spring 73c. The lever 73a is normally (i.e., when the lever 73a is not operated by the user) at the position (hereinafter referred to as a "reference position") at which biasing force is balanced between the two springs 73c. The user applies external force to the lever 73a to move the lever 73a in the circumferential direction against biasing force of the springs 73c. When the user releases the external force, the lever 73a returns to the reference position by biasing force of the springs 73c. That is, the lever 73a is elastically supported, and is operable against elastic force. In such a state, the contact 73f contacts the resistor member 73b, and is electrically connected to the resistor member 73b. A contact position between the resistor member 73b and the contact 73f moves in accordance with movement of the lever 73a. That is, a resistance value between a terminal connected to the contact 73f and a terminal connected to the resistor member 73b is detected as the operation amount of the lever 73a. The rotation speed of the zoom motor is determined based on the resistance value. That is, the drive signal is input from the lens microcomputer to the zoom motor such that the zoom motor rotates at a rotation speed corresponding to the resistance value.

A zoom switch opening 75a is formed in the zoom switch support 75c. The zoom switch support 75c closes the opening 70a of the outer frame 70, and exposes, through the zoom switch opening 75a, the operating section 73e of the zoom lever switch 73 to the outside. The zoom switch support 75c is raised toward the outside in the radial direction relative to the outer circumferential surface of the outer frame 70.

The basic configuration of the focus lever switch 74 is similar to that of the zoom lever switch 73. As well as the zoom lever switch 73, the focus lever switch 74 is a momentary (i.e., self-restoring) switch, and includes a switch body 74A and a focus switch support 75d.

The switch body 74A includes a lever 74a, a resistor member 74b, and two springs 74c. The switch body 74A includes a lever base 74d, an operating section 74e, and a contact 74f. The lever 74a is elastically supported by the springs 74c, and is operable against elastic force. Knurls are formed at a tip end surface of the operating section 74e. A resistance value between a terminal connected to the contact 74f and a terminal connected to the resistor member 74b is detected as the operation amount of the lever 74a. The rotation speed of the focus motor 53 is determined based on the resistance value. That is, the drive signal is input from the lens microcomputer to the focus motor 53 such that the focus motor 53 rotates at a rotation speed corresponding to the resistance value.

A focus switch opening 75b is formed in the focus switch support 75d. The focus switch support 75d closes the opening 70a of the outer frame 70, and exposes, through the focus switch opening 75b, the operating section 74e of the focus lever switch 74 to the outside. The focus switch support 75d is raised toward the outside in the radial direction relative to the outer circumferential surface of the outer frame 70.

The zoom switch support 75c and the focus switch support 75d are integrally formed, and form a cover 75.

The zoom lever switch 73 and the focus lever switch 74 are configured such that a shape varies between the zoom lever switch 73 and the focus lever switch 74.

Specifically, the zoom lever switch 73 and the focus lever switch 74 are formed such that the height H1 a of the operating section 73e and the height H1 b of the operating section 74e are different from each other. The "height H" means the amount of protrusion from the outer circumferential surface of the outer frame 70 to the outside in the radial direction. More specifically, the operating section 73e of the zoom lever switch 73 is higher than the operating section 74e of the focus lever switch 74. The zoom lever switch 73 and the focus lever switch 74 are formed such that the width W1a of the operating section 73e in the circumferential direction and the width Wb1b of the operating section 74e in the circumferential direction are different from each other. Specifically, the width W1a of the operating section 73e of the zoom lever switch 73 in the circumferential direction is greater than the width Wb1b of the operating section 74e of the focus lever switch 74 in the circumferential direction.

The zoom lever switch 73 and the focus lever switch 74 are formed such that the width W2a of the zoom switch support 75c in the circumferential direction and the width W2b of the focus switch support 75d in the circumferential direction are different from each other. Specifically, the width W2a of the zoom switch support 75c in the circumferential direction is greater than the width W2b of the focus switch support 75d in the circumferential direction.

4. Wiring of Lever Switch

Figure 14:
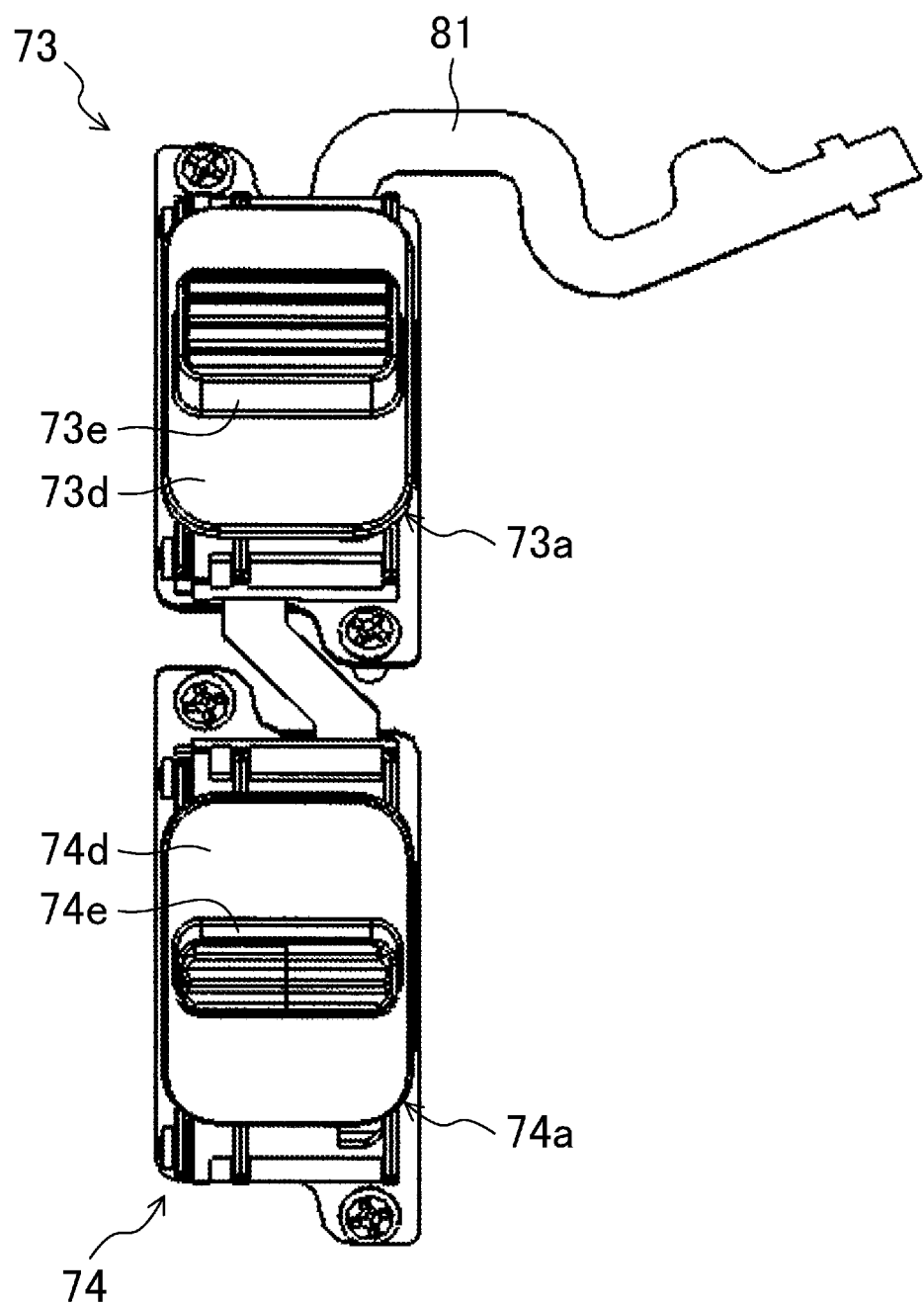
FIG. 14 is a side view of an assembly of the zoom lever switch, a focus lever switch, and a flexible printed circuit board, and corresponds to FIG. 10.

Next, wiring of the zoom lever switch 73 and the focus lever switch 74 will be described. FIG. 14 is a side view of an assembly of the zoom lever switch 73, the focus lever switch 74, and a flexible printed circuit board, and corresponds to FIG. 10.

The zoom lever switch 73 and the focus lever switch 74 are arranged adjacent to each other, and specifically arranged adjacent to each other in the circumferential direction. Thus, the same flexible printed circuit board 81 is connected to the zoom lever switch 73 and the focus lever switch 74. That is, the zoom lever switch 73 and the focus lever switch 74 are electrically connected to a single flexible printed circuit board 81. Specifically, the focus lever switch 74 and the zoom lever switch 73 are electrically connected to the flexible printed circuit board 81 in this order from one end side of the flexible printed circuit board 81. The flexible printed circuit board 81 slightly extends from the zoom lever switch 73 in the circumferential direction, and is bent toward the rear.

Referring to FIG. 12, the fifth lens group frame 50 is disposed inside the outer frame 70, and the printed circuit board 80 is disposed at the rear of the fifth lens group frame 50. Flexible printed circuit boards are drawn from various components of the lens barrel 3 to the rear side of the printed circuit board 80. For example, a flexible printed circuit board 82 is drawn from the zoom motor 52 to the rear side of the printed circuit board 80, and a flexible printed circuit board 83 is drawn from the focus motor 53 to the rear side of the printed circuit board 80. The flexible printed circuit board 83 is, at one end thereof, connected to a connector 84 of the printed circuit board 80. A first connector 83a and a second connector 83b are provided on the flexible printed circuit board 83. The flexible printed circuit board 81 is, at one end thereof, connected to the first connector 83a. The flexible printed circuit board 82 is, at one end thereof, connected to the second connector 83b. That is, the flexible printed circuit board 81 and the flexible printed circuit board 82 are joined to the flexible printed circuit board 83, and therefore are connected to the printed circuit board 80 through the flexible printed circuit board 83.

5. Operation of Lever Switch

Operation of the lever switches will be described below.

Referring to FIG. 1, the shutter button 2c is provided on an upper left surface of the camera body 2 as viewed from the side close to the object in the optical axis direction. In the case where the user holds the imaging apparatus 1 in the horizontal attitude, the imaging apparatus 1 is held with a right index finger being placed on the shutter button 2c. In such a state, a left hand is normally placed on the lens barrel 3 such that an index finger is positioned substantially in the third quadrant of the lens barrel 3 and that a thumb is positioned in the fourth or first quadrant of the lens barrel 3.

On the other hand, in the case where the imaging apparatus 1 is in the vertical attitude, the imaging apparatus 1 is often held such that the shutter button 2c is positioned on the upper side, and a right hand is placed on the upper side. Moreover, the left hand is often placed on the lens barrel 3 such that the index finger is positioned substantially in the fourth quadrant of the lens barrel 3 and that the thumb is positioned in the first or second quadrant of the lens barrel 3.

Regardless of whether the imaging apparatus 1 is in the horizontal attitude or the vertical attitude, any of the index finger and the thumb of the left hand is positioned in the arrangement region A formed of the first and fourth quadrants of the lens barrel 3. In the arrangement region A, the zoom lever switch 73 and the focus lever switch 74 are positioned. Thus, the user operates, with his index finger or thumb, the zoom lever switch 73 and the focus lever switch 74 in the state in which the left hand is effortlessly placed on the lens barrel 3.

When the zoom lever switch 73 and the focus lever switch 74 are operated, the user views the object through a finder or a liquid crystal screen of the camera body 2, and does not operate the zoom lever switch 73 and the focus lever switch 74 while looking the zoom lever switch 73 and the focus lever switch 74. For such a reason, there is a possibility that the user is not sure which one of the zoom lever switch 73 or the focus lever switch 74 is operated. As described above, the zoom lever switch 73 and the focus lever switch 74 are formed in the different shapes. Thus, by touching the switch, the user can identify, without looking, whether the switch to be operated is the zoom lever switch 73 or the focus lever switch 74.

6. Specific Structure of Cam Frame and Second Lens Group Frame

Figure 15:
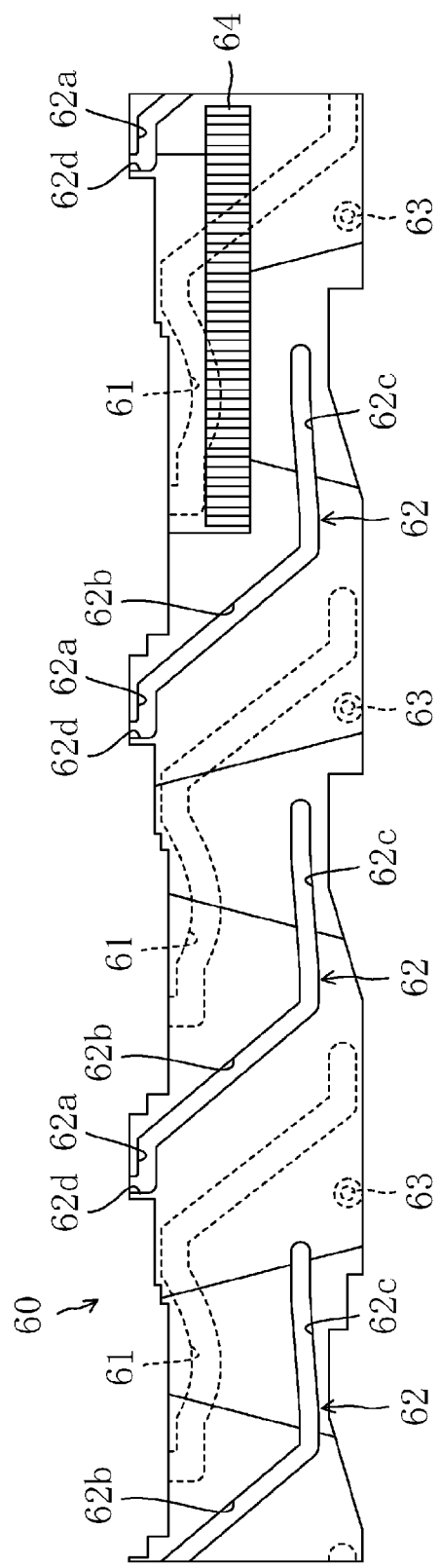
FIG. 15 is an exploded view of a cam frame when an inner circumferential surface of the cam frame is viewed from an inner circumferential side.
Figure 16:
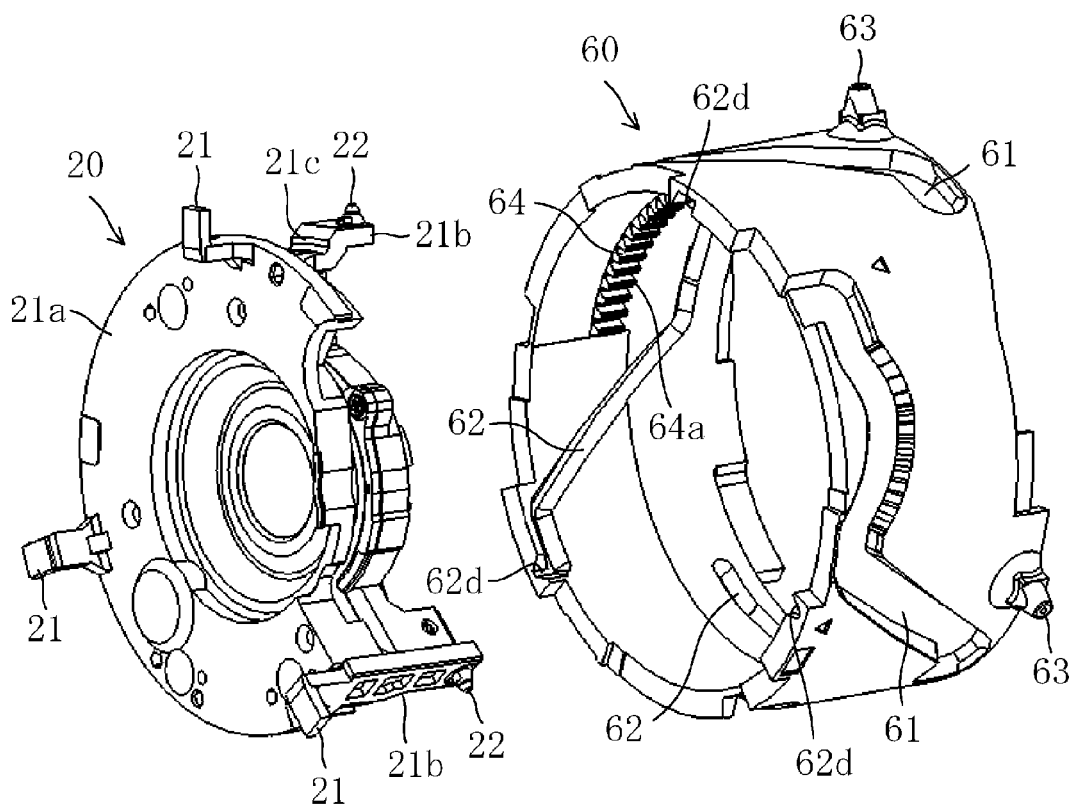
FIG. 16 is an oblique perspective view of a second lens group frame and the cam frame from the front.
Figure 17:
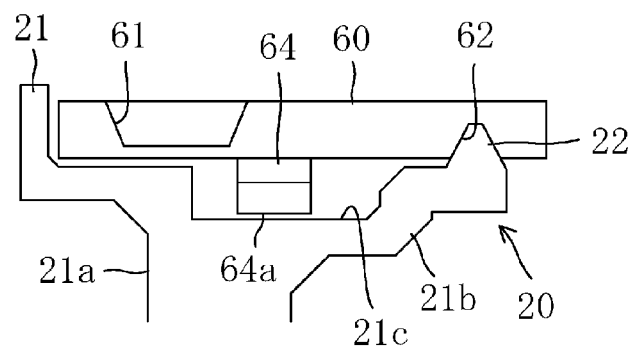
FIG. 17 is an enlarged longitudinal sectional view of part of the second lens group frame and part of the cam frame.
Figure 18:
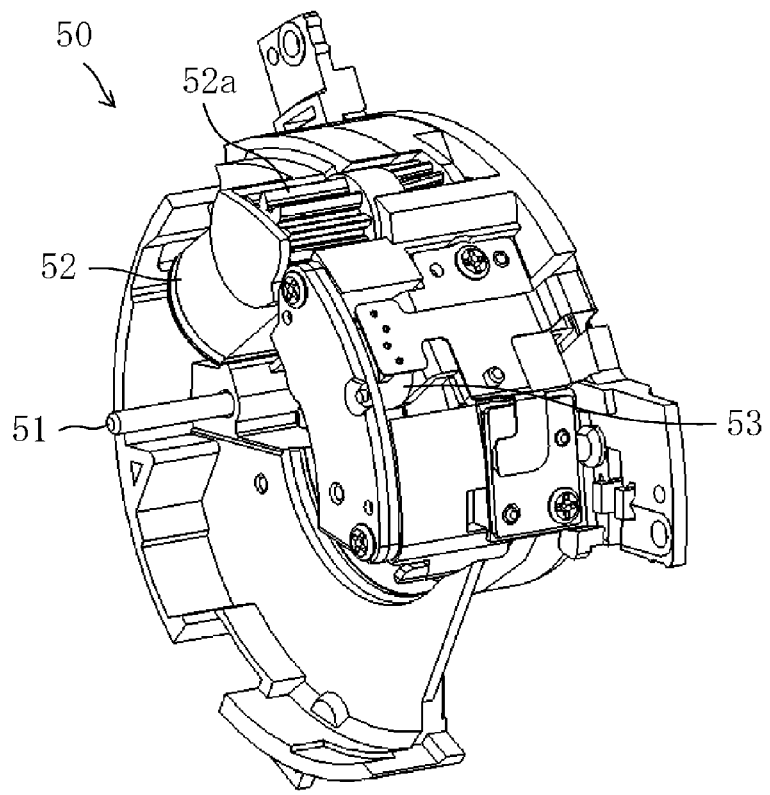
FIG. 18 is an oblique perspective view of a fifth lens group frame from the front.

FIG. 15 is an exploded view of the cam frame when the inner circumferential surface thereof is viewed from an inner circumferential side. FIG. 16 is an oblique perspective view of the second lens group frame and the cam frame from the front. FIG. 17 is an enlarged longitudinal sectional view of part of the second lens group frame and part of the cam frame. FIG. 18 is an oblique perspective view of the fifth lens group frame from the front.

FIG. 15 is the exploded view of the cam frame 60 when the inner circumferential surface thereof is viewed from the inner circumferential side. In FIG. 15, an upper side in the plane of paper is the side close to the object, and a lower side in the plane of paper is the side close to the camera body. Referring to FIG. 15, the plurality of second cam grooves 62 each extending in the predetermined pattern and the inner gear 64 inwardly protruding in the radial direction and extending in the circumferential direction are formed at the inner circumferential surface of the cam frame 60.

Three second cam grooves 62 are formed so as to be apart from each other in the circumferential direction. Each second cam groove 62 includes a first circumferential straight part 62a extending straight toward the right in the circumferential direction at the position close to an upper edge of the cam frame 60, an inclined straight part 62b extending straight from one end of the first circumferential straight part 62a so as to be inclined relative to the optical axis (i.e., extending obliquely downward to the right), and a second circumferential straight part 62c extending straight from one end of the inclined straight part 62b toward the right in the circumferential direction. A left end part of the first circumferential straight part 62a communicates with a cam pin insertion part 62d downwardly extending from the upper edge of the cam frame 60 along the optical axis.

The inner gear 64 is formed between the inclined straight parts 62b of adjacent ones of the second cam grooves 62 so as to extend in the circumferential direction. The inner gear 64 is, in the optical axis direction, positioned between the second circumferential straight part 62c of the left one of the second cam grooves 62 and the first circumferential straight part 62a of the right one of the second cam grooves 62. The inner gear 64 includes a plurality of teeth arranged in the circumferential direction and extending such that edges of the teeth are parallel to the optical axis.

As also will be seen from FIG. 16, the second lens group frame 20 is the circular component formed with an opening at the center thereof. The second lens group frame 20 includes a base 21a configured to hold the second lens group G2 at the opening thereof, the plurality of protrusions 21 each outwardly protruding from a front end part of the base 21a in the radial direction, a plurality of extensions 21b provided so as to be apart from each other in the circumferential direction of the base 21a and each protruding toward the rear from an outer circumferential end part of the base 21a, and the cam pins 22 each outwardly protruding from a tip end part of a corresponding one of the extensions 21b in the radial direction. Each cam pin 22 is fitted into a corresponding one of the second cam grooves 62 of the cam frame 60.

A stepped part 21c is formed in one of the extensions 21b (see FIG. 17). The stepped part 21c forms a relief clearance configured to avoid contact between a tooth tip 64a of the inner gear 64 and the extension 21b while the cam pin 22 is moving according to the second cam groove 62. Specifically, the stepped part 21c is in a shape inwardly recessed in the radial direction as compared to the tooth tip 64a of the inner gear 64 so as to overlap with the inner gear 64 as viewed in the radial direction and so as not to overlap with the tooth tip 64a of the inner gear 64 as viewed in the circumferential direction.

7. Wiring of Motor

Figure 19:
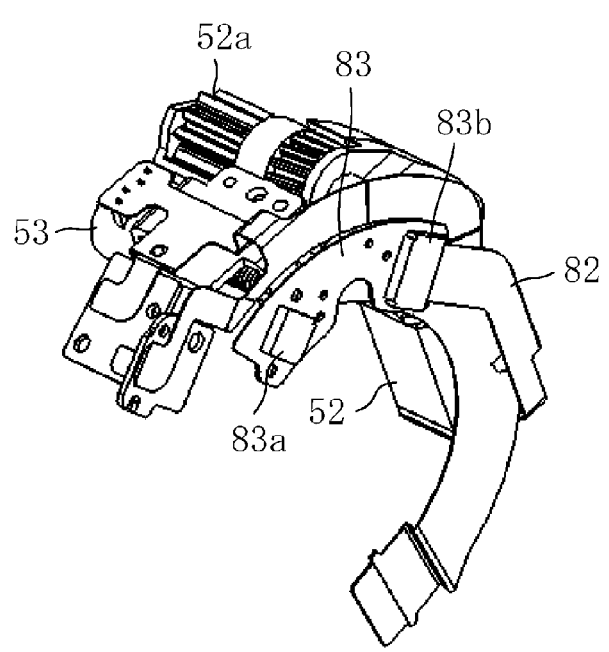
FIG. 19 is a perspective view illustrating the configuration of the flexible printed circuit board.
Figure 20:
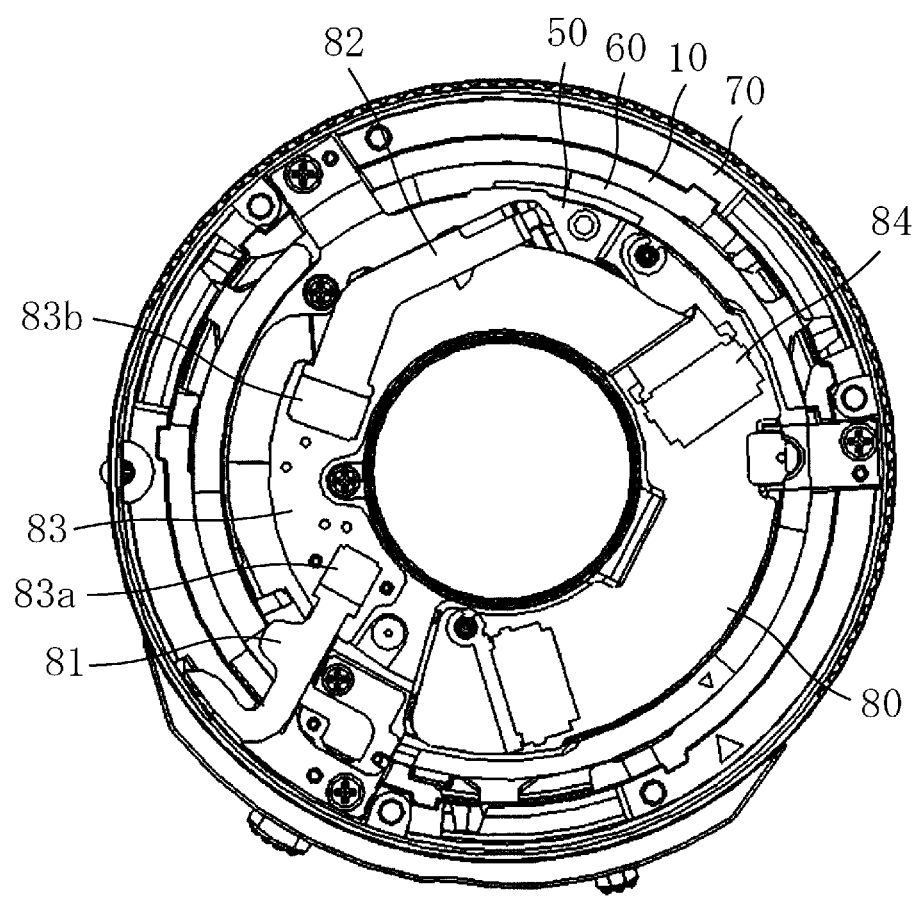
FIG. 20 is a rear view of the lens barrel in the state in which the lens mount is detached.

FIG. 19 is a perspective view illustrating the configuration of the flexible printed circuit board. FIG. 20 is a rear view of the lens barrel in the state in which the lens mount is detached.

Next, wiring of the zoom motor 52 and the focus motor 53 will be described. Referring to FIGS. 19 and 20, the zoom motor 52 and the focus motor 53 are electrically connected to the single flexible printed circuit board 83.

Specifically, the flexible printed circuit board 82 is electrically connected to the zoom motor 52. The flexible printed circuit board 83 is electrically connected to the focus motor 53. The flexible printed circuit boards 82, 83 are drawn to the rear side of the fifth lens group frame 50.

The printed circuit board 80 is disposed at the rear of the fifth lens group frame 50. The flexible printed circuit board 83 is, at one end thereof, connected to the connector 84 of the printed circuit board 80. The first connector 83a and the second connector 83b are provided on the flexible printed circuit board 83.

The flexible printed circuit board 81 is, at one end thereof, connected to the first connector 83a. The flexible printed circuit board 81 is, at the other end thereof, electrically connected to the zoom lever switch 73 and the focus lever switch 74.

The flexible printed circuit board 82 is, at one end thereof, connected to the second connector 83b. That is, the flexible printed circuit boards 81, 82 are joined to the flexible printed circuit board 83, and therefore are connected to the printed circuit board 80 through the flexible printed circuit board 83.

8. Molds of Cam Frame

Figure 21:
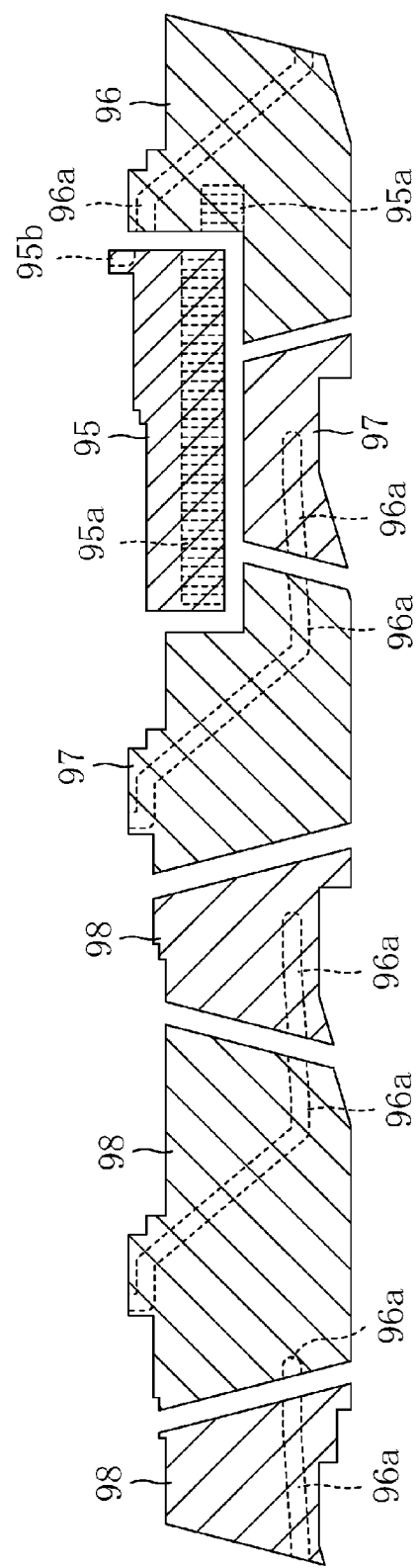
FIG. 21 is an exploded view of an assembly of first to fourth molds when an inner circumferential surface thereof is viewed from an inner circumferential side.
Figure 22:
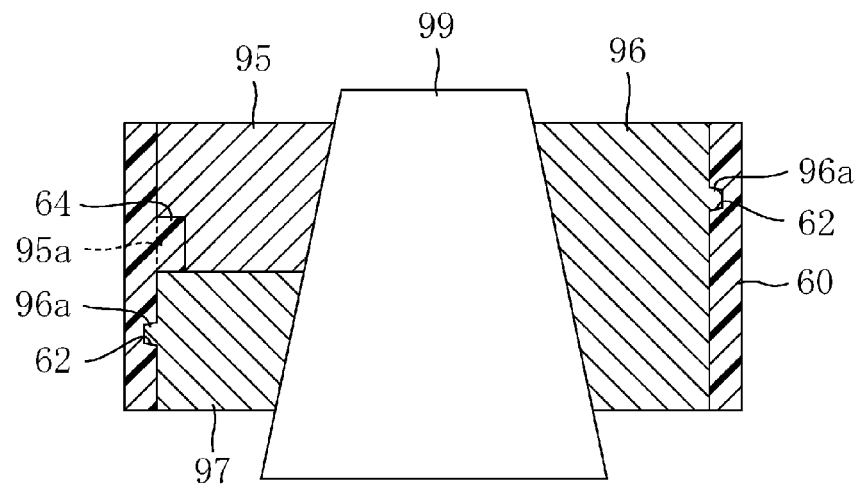
FIG. 22 is a longitudinal sectional view illustrating the state in which the first to fourth molds and a base mold are assembled together.
Figure 23:
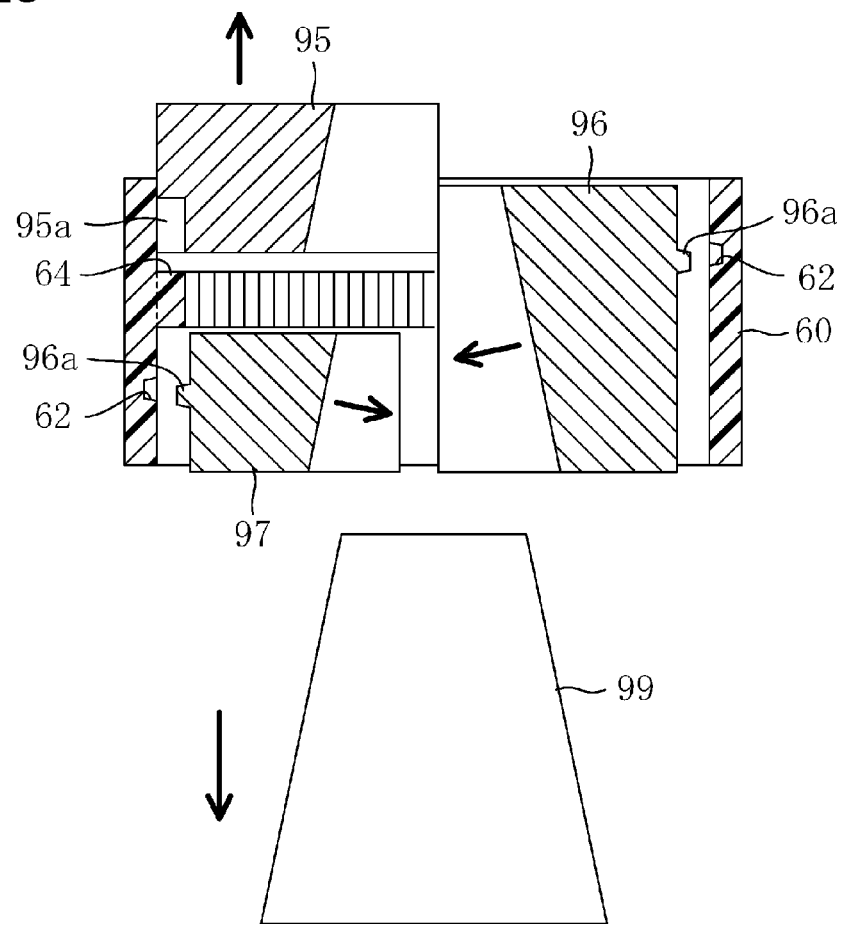
FIG. 23 is a longitudinal sectional view illustrating the state in which the first to fourth molds and the base mold are removed.

FIG. 21 is an exploded view of an assembly of first to fourth molds when an inner circumferential surface thereof is viewed from an inner circumferential side. FIG. 22 is a longitudinal sectional view illustrating the state in which the first to fourth molds and a base mold are assembled together. FIG. 23 is a longitudinal sectional view illustrating the state in which the first to fourth molds and the base mold are removed. Three second cam grooves 62 and a single inner gear 64 are formed at the inner circumferential surface of the cam frame 60. Seven separate molds illustrated in FIG. 21 are used to form the inner circumferential surface of the cam frame 60 by resin molding. Although a mold(s) for forming the first cam grooves 61 at the outer circumferential surface of the cam frame 60 is additionally required, the description thereof will not be made below, and only the molds for forming the inner circumferential surface of the cam frame 60 will be described.

Referring to FIG. 21, the molds for forming the inner circumferential surface of the cam frame 60 include a first mold 95 configured to form part of the inner gear 64 and the cam pin insertion part 62d, a second mold 96 configured to form the remaining part of the inner gear 64 and part of the second cam groove 62 positioned on one side (i.e., the upper side as viewed in FIG. 21) relative to the inner gear 64 in the optical axis direction, a third mold 97 configured to form the second cam groove 62 positioned on the other side (i.e., the lower side as viewed in FIG. 21) relative to the inner gear 64 in the optical axis direction, and a fourth mold 98 configured to form the second cam groove 62 apart from the inner gear 64 in the circumferential direction.

The first mold 95 includes a gear molding part 95a corresponding to part of the inner gear 64, and a pin insertion molding part 95b corresponding to the cam pin insertion part 62d. The second mold 96 includes a gear molding part 95a corresponding to the remaining part of the inner gear 64, and a cam groove molding part 96a corresponding to part of the second cam groove 62. The third and fourth molds 97, 98 each include a cam groove molding part 96a corresponding to the second cam groove 62.

A left end edge (i.e., a left end edge of the cam groove molding part 96a) of the first circumferential straight part 62a of the second cam groove 62 formed using the second mold 96 is a separation line at which the first mold 95 and the second mold 96 are separated from each other in the circumferential direction. That is, part of the inner gear 64 and the cam pin insertion part 62d on the left side of the separation line are formed using the first mold 95. Moreover, the remaining part of the inner gear 64 on the right side of the separation line is formed using the second mold 96.

A left end edge (more precisely, a position slightly apart from the left end edge of the inner gear 64) of the inner gear 64 formed using the first mold 95 is a separation line at which the first mold 95 and the third mold 97 are separated from each other in the circumferential direction. A lower end edge of the inner gear 64 formed using the first mold 95 is a separation line at which the first mold 95 and the second mold 96 are separated from each other in the optical axis direction and the first mold 95 and the third mold 97 are separated from each other in the optical axis direction.

Each of the first to fourth molds 95-98 is formed in an arc shape. The first to fourth molds 95-98 are assembled into a ring-shaped mold illustrated in FIG. 22. The inner circumferential surface of the ring-shaped assembly of the first to fourth molds 95-98 forms a tapered shape in which the size of an opening decreases toward the upper side. A conical base mold 99 is fitted into the ring-shaped assembly of the first to fourth molds 95-98 along the inner circumferential surface thereof. The cam frame 60 is, by resin molding, formed using the first to fourth molds 95-98, the base mold 99, and other outer-circumferential-side mold(s) which is not shown in the figure.

After the cam frame 60 is formed by resin molding, the base mold 99 is first moved downward and removed as illustrated in FIG. 23. Since the tooth edges of the inner gear 64 extend parallel to the optical axis, the first mold 95 is moved upward and removed. Since the second cam grooves 62 are formed using the second to fourth molds 96-98, the second to fourth molds 96-98 cannot be moved in the optical axis direction. For such a reason, the second to fourth molds 96-98 are obliquely downwardly moved toward the inside in the radial direction, and then are removed. In this manner, the cam frame 60 including, at the inner circumferential surface thereof, the second cam grooves 62 and the inner gear 64 can be formed by resin molding.

6. Conclusion

According to the present embodiment, the lens barrel 3 includes the outer frame 70, the optical system L disposed inside the outer frame 70, the zoom lever switch 73 (i.e., the zoom operation section) disposed on the outer circumference of the outer frame 70, the focus lever switch 74 (i.e., the focus operation section) disposed on the outer circumference of the outer frame 70, the electric zoom motor 52 and the cam frame 60 (i.e., the zoom adjustment mechanism) which are configured to adjust the magnification of the optical system L in response to an output from the zoom lever switch 73, and the electric focus motor 53 and the fourth lens group frame 40 (i.e., the focus adjustment mechanism) which are configured to adjust the focus of the optical system L in response to an output from the focus lever switch 74. In the state in which the lens barrel 3 is attached to the camera body 2 in the horizontal attitude, at least part of the zoom lever switch 73 and at least part of the focus lever switch 74 are arranged in the arrangement region A formed of the first quadrant Q1 and the fourth quadrant Q4 of the lens barrel 3 as viewed from the side close to the object in the optical axis direction.

Regardless of whether the imaging apparatus 1 is in the horizontal attitude or the vertical attitude, the user can easily operate, with his index finger or thumb, the zoom lever switch 73 and the focus lever switch 74 in the state in which the left hand is effortlessly placed on the lens barrel 3. As a result, operability of the zoom lever switch 73 and the focus lever switch 74 can be improved. Moreover, since the zoom lever switch 73 and the focus lever switch 74 are arranged in the circumferential direction, the dimensions of the lens barrel 3 in the optical axis direction can be reduced.

Various operation sections are provided for the camera body 2 and the lens barrel 3. The zoom lever switch 73 and the focus lever switch 74 are operation sections which are often used upon shooting and which are operated while the user is viewing an object image (i.e., operated without looking the operation sections themselves). Thus, since the zoom lever switch 73 and the focus lever switch 74 are arranged as described above, operability and usability of the lens barrel 3 can be improved.

In the configuration in which the zoom lever switch 73 and the focus lever switch 74 which are for electrical driving are provided on the outer frame 70, the zoom lever switch 73 and the focus lever switch 74 share the single flexible printed circuit board 81, and therefore the space where the flexible printed circuit board 81 is laid can be reduced. Thus, the size of the lens barrel 3 can be reduced. Moreover, since the two switches 73, 74 share the same flexible printed circuit board, the number of components can be reduced, and assembly properties can be improved.

At least part of one of the zoom lever switch 73 or the focus lever switch 74 is disposed in the first quadrant Q1, and at least part of the other one of the zoom lever switch 73 or the focus lever switch 74 is disposed in the fourth quadrant Q4. The operability can be improved in such a manner that the zoom lever switch 73 and the focus lever switch 74 are separated from each other to some extent. That is, if the zoom lever switch 73 and the focus lever switch 74 are too close to each other, it is difficult to distinguish between the zoom lever switch 73 and the focus lever switch 74 by the arrangement position. Moreover, there is a possibility that, when one of the switches should be operated, the other switch is undesirably operated. Since one of the switches is disposed in the first quadrant Q1, and the other switch is disposed in the fourth quadrant Q4, the zoom lever switch 73 and the focus lever switch 74 can be separated from each other with a moderate distance. Thus, the user can easily distinguish between the zoom lever switch 73 and the focus lever switch 74 by the arrangement position. Moreover, when one of the switches should be operated, undesirable operation of the other switch can be reduced or prevented.

At least part of the zoom lever switch 73 and at least part of the focus lever switch 74 are arranged on a single circle about the optical axis. Thus, the operability of the zoom lever switch 73 and the focus lever switch 74 can be improved, and the size of the lens barrel 3 can be reduced. That is, in the state in which the hand is placed on the outer frame 70, the thumb and the index finger are positioned on the single circle about the optical axis, i.e., positioned on the same circle. Since the zoom lever switch 73 and the focus lever switch 74 are arranged on the single circle about the optical axis, the zoom lever switch 73 and the focus lever switch 74 can be easily operated with the thumb and the index finger. Moreover, since the zoom lever switch 73 and the focus lever switch 74 are arranged on the single circle about the optical axis, the position of the zoom lever switch 73 in the optical axis direction and the position of the focus lever switch 74 in the optical axis direction are substantially coincident with each other. Thus, the dimensions of the outer frame 70 in the optical axis direction can be reduced, and therefore the dimensions of the lens barrel 3 in the optical axis direction can be reduced.

The zoom lever switch 73 and the focus lever switch 74 are configured such that at least one of the shape, the texture, or the property contributing to a user's operation feeling varies between the zoom lever switch 73 and the focus lever switch 74. Thus, the user can distinguish between the zoom lever switch 73 and the focus lever switch 74 without looking the zoom lever switch 73 and the focus lever switch 74. As a result, the operability of the zoom lever switch 73 and the focus lever switch 74 can be improved.

For example, the lens barrel 3 includes the outer frame 70 and the zoom lever switch 73 and the focus lever switch 74 which are provided on the outer frame 70. The zoom lever switch 73 and the focus lever switch 74 are configured to have the different shapes. Thus, the user can distinguish, without looking, between the zoom lever switch 73 and the focus lever switch 74 by the feeling of touch or operation. As a result, the operability of the zoom lever switch 73 and the focus lever switch 74 can be improved.

Specifically, the height H1a of the operating section 73e of the zoom lever switch 73 and the height H1b of the operating section 74e of the focus lever switch 74 are different from each other, and therefore the shapes of the zoom lever switch 73 and the focus lever switch 74 are different from each other.

The width W1a of the operating section 73e of the zoom lever switch 73 in the circumferential direction and the width Wb1b of the operating section 74e of the focus lever switch 74 in the circumferential direction are different from each other, and therefore the shapes of the zoom lever switch 73 and the focus lever switch 74 are different from each other.

The width W2a of the zoom switch support 75c of the zoom lever switch 73 in the circumferential direction and the width W2b of the focus switch support 75d of the focus lever switch 74 in the circumferential direction are different from each other, and therefore the shapes of the zoom lever switch 73 and the focus lever switch 74 are different from each other.

As an example of the method for varying the shape between the zoom lever switch 73 and the focus lever switch 74, one (in the present embodiment, the zoom lever switch 73) of the zoom lever switch 73 or the focus lever switch 74 positioned on a counterclockwise side as viewed from the side close to the object in the arrangement region A is higher than the other one of the zoom lever switch 73 or the focus lever switch 74 positioned on a clockwise side. In the state in which the left hand is placed on a lower side of the lens barrel 3, the switch on the counterclockwise side is positioned on a tip end side of the thumb, and the switch on the clockwise side is positioned on a base end side of the thumb. Since the switch on the counterclockwise side is higher, erroneous operation of the switch on the clockwise side with the base of the thumb or the proximity thereof when the switch on the counterclockwise side is operated with the thumb can be reduced or prevented.

Various operation sections are provided for the camera body 2 and the lens barrel 3. The zoom lever switch 73 and the focus lever switch 74 are operation sections which are often used upon shooting and which are operated while the user is viewing an object image (i.e., operated without looking the operation sections themselves). Thus, since the zoom lever switch 73 and the focus lever switch 74 are formed in the different shapes, the operability and usability of the lens barrel 3 can be improved.

In the present embodiment, the lens barrel 3 includes the lens mount 90 configured to determine the position of the lens barrel 3 relative to the camera body 2 with the lens mount 90 contacting the camera body 2, the fixed frame (i.e., the outer frame 70) attached to the lens mount 90, and the movable frame (i.e., the cam frame 60) housed so as to be movable in the optical axis direction in the fixed frame. In the lens mount 90, the followings are provided: the attachment part (i.e., the attachment surface 92) to which the fixed frame is attached; and the recessed part 93 which is recessed toward the camera body 2 as compared to the attachment part and into which the end part of the movable frame enters at least when the movable frame is positioned closest to the lens mount 90. The part 90A of the lens mount 90 where the attachment part is formed has a thickness greater than the part 90B of the lens mount 90 where the recessed part 93 is formed.

Size reduction has been demanded for some types of lens barrels. However, if the size of a lens barrel is reduced, a movable range of a movable frame is limited. In order to reduce the size of the lens barrel and ensure the movable range of the movable frame, it is necessary that, e.g., an essentially-required component is moved or deformed.

Since the configuration in which part of the lens mount 90 facing the movable frame is recessed and part of the movable frame enters such a recessed part is employed as in the foregoing, the movable range of the movable frame can be expanded.

In such a configuration, the part 90A of the attachment surface 92 of the lens mount 90 is formed so as to have the thickness T1 greater than the thickness T2 of the part 90B of the recessed part 93, thereby maintaining the strength of the lens mount 90. That is, the lens mount 90 is a component required for attaching the lens barrel 3 to the camera body, and a certain degree of strength is required for the lens mount 90. The strength of the lens mount 90 may be lowered due to the recessed part 93 of the lens mount 90. However, according to the foregoing configuration, even if the recessed part 93 is formed in the lens mount 90, the thickness of the part 90A where the attachment surface 92 is formed can be increased to improve the strength of the lens mount 90.

Of the part 90B where the recessed part 93 is formed, part excluding part of the part 90B facing the end part of the movable frame when the movable frame is positioned closest to the lens mount is formed with the protrusion 93a projecting relative to the part facing the end part of the movable frame. This improves the strength of the lens mount 90.

The protrusion 93a is positioned inside the part facing the end part of the movable frame in the radial direction. Thick parts are formed inside and outside the recessed part 93 in the radial direction. According to this configuration, even if the recessed part 93 is formed in the lens mount 90, the strength of the lens mount 90 can be improved.

According to the present embodiment, the lens barrel 3 includes the cylindrical cam frame 60 formed, at the inner circumferential surface thereof, with the second cam grooves 62 each extending in the predetermined pattern, and the inner gear 64 inwardly protruding in the radial direction and extending in the circumferential direction; and the second lens group frame 20 including the base 21a configured to hold the first to sixth lenses L4-L6 inside the cam frame 60, the extensions 21b each extending from the outer circumferential end part of the base 21a in the optical axis direction, and the cam pins 22 each outwardly protruding from the tip end part of a corresponding one of the extensions 21b and fitted into a corresponding one of the second cam grooves 62. In the extension 21b, the stepped part 21c inwardly recessed in the radial direction as compared to the tooth tip 64a of the inner gear 64 is formed so as to, when each cam pin 22 moves according to a corresponding one of the second cam grooves 62, overlap with the inner gear 64 as viewed in the radial direction and so as not to overlap with the tooth tip 64a of the inner gear 64 as viewed in the circumferential direction.

For example, in each of lens barrels of Japanese Unexamined Patent Publication No. 2010-186192 (hereinafter referred to as "Patent Document 1") and Japanese Unexamined Patent Publication No. 2010-204563 (hereinafter referred to as "Patent Document 2"), a gear part is formed at a rear end of an outer circumferential surface of a drive frame formed with cam grooves. The gear part of the drive frame is engaged with a drive gear of a fixed frame. In such a state, when a zoom motor is operated, drive force of the zoom motor is transmitted to the gear part of the drive frame through the drive gear. The drive frame is rotatably driven. While rotating relative to the fixed frame, the drive frame is moving in an optical axis direction. As a result, a lens(es) is moving in the optical axis direction.

However, in each of the lens barrels of Patent Documents 1 and 2, the gear is formed at the outer circumferential surface of the drive frame, and therefore a drive gear of the zoom motor should be disposed outside the drive frame in a radial direction. In this configuration, the outer diameter of the lens barrel increases, and it is difficult to reduce the size of the lens barrel.

For such a reason, it is necessary to devise arrangement of a gear of a cam frame to provide a lens barrel having a reduced size.

According to the foregoing configuration, since the inner gear 64 is formed at the inner circumferential surface of the cam frame 60, the size of the lens barrel 3 can be reduced as compared to the case where the gear is formed at the outer circumferential surface of the cam frame 60. Moreover, since the stepped part 21c is formed in the extension 21b of the second lens group frame 20, the second lens group frame 20 can smoothly move in the optical axis direction without contact between the tooth tip 64a of the inner gear 64 and the extension 21b of the second lens group frame 20 when each cam pin 22 moves according to a corresponding one of the second cam grooves 62.

The mold for forming the inner circumferential surface of the cam frame 60 is divided into the first mold 95 configured to form part of the inner gear 64 and the cam pin insertion part 62d, the second mold 96 configured to form the remaining part of the inner gear 64 and part of the second cam groove 62 positioned above the inner gear 64, the third mold 97 configured to form the second cam groove 62 positioned below the inner gear 64, and the fourth mold 98 configured to form the second cam groove 62 apart from the inner gear 64 in the circumferential direction.

Since the tooth edges of the inner gear 64 extend parallel to the optical axis, the first mold 95 can be moved upward and removed, and the second to fourth molds 96-98 are obliquely downwardly moved toward the inside in the radial direction and removed. The cam frame 60 including, at the inner circumferential surface thereof, the second cam grooves 62 and the inner gear 64 can be formed by resin molding.

Other Embodiments

As described above, the embodiment has been described as an example technique disclosed in the present application. However, the technique according to the present disclosure is not limited to the foregoing embodiment, but is also applicable to those where modifications, substitutions, additions, and omissions are made. In addition, elements described in the foregoing embodiment may be combined to provide a different embodiment.

The foregoing embodiment may have the following configurations.

That is, the configuration of the lens barrel 3 is not limited to that of the foregoing embodiment. In other words, as long as the lens barrel is configured to electrically drive the zoom lens(es) and the focus lens(es), any types of lens barrels can be employed.

The lens barrel 3 is the interchangeable lens barrel detachably attached to the camera body 2, but is not limited to such a barrel. The lens barrel 3 may be attached to the camera body 2 so as not to be detached from the camera body 2. For example, the lens barrel 3 may be a lens barrel of a compact camera.

As long as the camera body 2 is a device having an imaging function, any types of devices can be employed. That is, the camera body 2 may be, e.g., a still camera, a video camera, or a mobile phone or a mobile terminal including a camera section.

In the foregoing embodiment, the zoom lever switch 73 is disposed in the first quadrant Q1, and the focus lever switch 74 is disposed in the fourth quadrant Q4. However, the present disclosure is not limited to such a configuration. The zoom lever switch 73 may be disposed in the fourth quadrant Q4, and the focus lever switch 74 may be disposed in the first quadrant Q1. Alternatively, both of the zoom lever switch 73 and the focus lever switch 74 may be arranged in the first quadrant Q1 or the fourth quadrant Q4.

In the foregoing embodiment, the zoom lever switch 73 and the focus lever switch 74 are formed in the different shapes in such a manner that the heights H of the operating sections 73e, 74e vary from each other, that the widths W1 of the operating sections 73e, 74e in the circumferential direction vary from each other, and that the widths W2 of the switch supports 75c, 75d vary from each other. However, the present disclosure is not limited to such a configuration. Any of the foregoing dimensions may vary between the operation sections. Alternatively, other configurations may vary between the operation sections. As still another alternative, any of the foregoing differences may be optionally combined together. For example, the height H2a of the operating section 73e from the zoom switch support 75c and the height H2b of the operating section 74e from the focus switch support 75d may be different from each other. The widths of the operating sections 73e, 74e in the optical axis direction may be different from each other. The height of the zoom switch support 75c and the height of the focus switch support 75d may different from each other. The areas of the tip end surfaces (i.e., operation surfaces at which the user operates the operating sections 73e, 74e) of the operating sections 73e, 74e may different from each other. The shapes of the tip end surfaces of the operating sections 73e, 74e may different from each other. Although the tip end surfaces of the operating sections 73e, 74e are in a substantially rectangular shape in the foregoing embodiment, any of the tip end surfaces may be in, e.g., a substantially circular shape or a substantially triangular shape. Although knurls are formed at the tip end surfaces of the operating sections 73e, 74e in the foregoing embodiment, different surface treatments may be applied to the operating sections 73e, 74e. For example, the types of knurling may vary between the operating sections 73e, 74e, or different surface treatments other than knurling may be applied to the operating sections 73e, 74e. Alternatively, a surface treatment may be applied to one of the tip end surfaces of the operating sections 73e, 74e, and no surface treatment may be applied to the other tip end surface of the operating sections 73e, 74e.

In the foregoing embodiment, the zoom lever switch 73 and the focus lever switch 74 are formed in the different shapes. However, the materials of the zoom lever switch 73 and the focus lever switch 74 may be different from each other. For example, the materials of the operating sections 73e, 74e may be different from each other. One of the operation sections may be made of, e.g., metal, and the other operation section may be made of, e.g., resin. Alternatively, one of the operation sections may be made of resin plated with metal, and the other operation section may be made of resin which is not plated with metal. As still another alternative, one of the operation sections may be made of resin coated with rubber, and the other operation section may be made of resin which is not coated with rubber. As just described, the materials themselves of the operating sections 73e, 74e may be different from each other, or the surface textures of the operating sections 73e, 74e may vary by plating or coating.

Operation force may be different between the zoom lever switch 73 and the focus lever switch 74. For example, the spring constant of the spring 73c of the zoom lever switch 73 and the spring constant of the spring 74c of the focus lever switch 74 may be different from each other. In this case, the operation force of the focus lever switch 74 is smaller than that of the zoom lever switch 73, thereby more precisely adjusting the focus of the optical system L as compared to the magnification of the optical system L. Note that a method for varying operation force is not limited to the method by which the spring constants of the springs 73c, 74c vary from each other. The slide resistance of the lever 73a and the slide resistance of the lever 74a may be different from each other.

An operation method may vary between the zoom lever switch 73 and the focus lever switch 74. For example, a switch type may be different. Specifically, one of the switches may be a lever switch, and the other switch may be a seesaw switch. Alternatively, switches (e.g., push switches) other than the foregoing switches may be used. As still another alternative, in the case where both switches are lever switches, one of the switches may be configured to be slidable with the switch being pushed in, and the other switch may be configured to be slidable without the switch being pushed in. The operation directions (i.e., directions in which the switches move during operation thereof) of both switches may be different from each other. That is, although both of the zoom lever switch 73 and the focus lever switch 74 are configured to slide in the circumferential direction in the foregoing embodiment, the zoom lever switch 73 and the focus lever switch 74 may be configured such that one of the zoom lever switch 73 or the focus lever switch 74 slides in the optical axis direction. In the case of the seesaw switches, a swing shaft of one of the switches may be coincident with the optical axis direction, a swing shaft of the other switch may be coincident with the circumferential direction (more precisely, a tangential direction).

The levers 73a, 74a of the zoom lever switch 73 and the focus lever switch 74 have been mainly described above. The shapes or materials of the switch supports 75c, 75d may be vary from each other in the similar manner.

As just described, the shapes of the zoom lever switch 73 and the focus lever switch 74 are not necessarily different from each other, and any one of the material, operation force, or operation method may be different between the zoom lever switch 73 and the focus lever switch 74. Note that all or some of the shape, material, operation force, and operation method may be different between the zoom lever switch 73 and the focus lever switch 74.

For example, either one of two switches may be larger or smaller in a size relationship, and may be higher or lower in a height relationship.

In the foregoing embodiment, two operation sections provided on the barrel body 3A are the zoom lever switch 73 and the focus lever switch 74, but are not limited to the zoom lever switch 73 and the focus lever switch 74. For example, the operation sections may be diaphragm operation switches each configured to adjust a diaphragm. The number of operation sections provided on the barrel body 3A is not limited to two, and three or more operation sections may be provided. In such a case, in the configuration in which the operation sections are arranged in the arrangement region A, all of the operation sections are preferably arranged in the arrangement region A, but at least two of the operation sections may be arranged in the arrangement region A. Of all of the operation sections, at least two operation sections which are often used upon imaging are, in this case, preferably arranged in the arrangement region A. In the configuration in which the shape, the material, the operation force, and/or the operation method vary among the operation sections, they preferably vary among all of the operation sections, but may vary between at least two of the operation sections. In such a case, the shape, the material, the operation force, and/or the operation method preferably vary between at least two of the operation sections operated upon imaging, and in particular between at least two of the operation sections operated while the user is viewing an object image.

The configuration in which the end part of the cam frame 60 enters the recessed part 93 of the lens mount 90 is employed, but the present disclosure is not limited to such a configuration. Depending on the configuration of the lens barrel, the movable frame, e.g., the first lens group frame 10, other than the cam frame 60 may enter the recessed part 93. Moreover, the number of movable frames entering the recessed part 93 is not limited to one, and a plurality of movable frames may enter the recessed part 93.

As long as the stepped part 21c formed in the extension 21b of the second lens group frame 20 can avoid contact with the inner gear 64, the shape of the stepped part 21c is not limited to that of the foregoing embodiment.

Three extensions 21b of the second lens group frame 20 are arranged so as to be apart from each other in the circumferential direction of the base 21a, but the number of extensions 21b are not limited to three. Moreover, the stepped part 21c is formed in one of the three extensions 21b, but the present disclosure is not limited to such a configuration. For example, the stepped part 21c may be formed in each extensions 21b.

The extension 21b of the second lens group frame 20 may extend, at the position inside the tooth tip 64a of the inner gear 64 in the radial direction, from the base 21a in the optical axis direction so as not to overlap with the tooth tip 64a of the inner gear 64 as viewed in the circumferential direction. In such a configuration, even if no stepped part 21c is formed in the extension 21b, contact with the inner gear 64 can be avoided. The present disclosure is not limited to the configuration in which one of the three extensions 21b extends, without the stepped part, from the base 21a in the optical axis direction at the position inside the tooth tip 64a of the inner gear 64 in the radial direction. For example, all of the extensions 21b may have the similar configuration.

The positions at which the first to fourth molds 95-98 are separated from each other and the number of the first to fourth separate molds 95-98 have been described as one example, and are not limited to those of the foregoing embodiment. For example, only part of the inner gear 64 may be formed using the first mold 95, and the cam pin insertion part 62d, the remaining part of the inner gear 64, and the second cam groove 62 positioned above the inner gear 64 may be formed using the second mold 96.

A right end edge (i.e., a right end edge of the cam groove molding part 96a) of the second circumferential straight part 62c of the second cam groove 62 positioned below the inner gear 64 may be a separation line at which the first mold 95 and the second mold 96 are separated from each other in the circumferential direction. That is, part of the inner gear 64 positioned on the right side relative to such a separation line is formed using the first mold 95. The remaining part of the inner gear 64 positioned on the left side relative to the separation line is formed using the second mold 96. In such a state, a right end edge (or a position slightly apart from the right end edge of the inner gear 64) of the inner gear 64 formed using the first mold 95 may be a separation line at which the first mold 95 and the third mold 97 are separated from each other in the circumferential direction. Moreover, an upper end edge of the inner gear 64 formed using the first mold 95 may be a separation line at which the first mold 95 and the second mold 96 are separated from each other in the optical axis direction and the first mold 95 and the third mold 97 are separated from each other in the optical axis direction.

The foregoing embodiments have been set forth merely for the purpose of preferred examples in nature, and are not intended to limit the scope, applications, and use of the invention.

As described above, the technique disclosed herein is useful for a lens barrel.

Various embodiments have been described above as example techniques of the present disclosure, in which the attached drawings and the detailed description are provided.

As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A lens barrel in which a lens is movable in an optical axis direction, comprising:
   a cylindrical cam frame formed, at an inner circumferential surface thereof, with
      a cam groove extending in a predetermined pattern, and
      an inner gear inwardly protruding in a radial direction and extending in a circumferential direction; and
   a lens frame including
      a base configured to hold the lens inside the cam frame,
      an extension extending from the base in the optical axis direction, and
      a cam pin outwardly protruding from a tip end part of the extension in the radial direction and fitted into the cam groove,
   wherein the extension includes
      a first member extending from the base along a first axis which is parallel with the optical axis,
      a second member disposed along a second axis which is outside of the first axis in the radial direction about the optical axis, extending along the second axis, and configured to hold the cam pin, and
      a third member connecting between the first and second members, and
   a stepped part which, when the cam pin moves according to the cam groove, overlaps with the inner gear as viewed in the radial direction and is recessed toward an inside in the radial direction as compared to a tooth tip of the inner gear so as not to contact the inner gear is provided in the extension.

2. The lens barrel of claim 1, wherein
   the extension includes a plurality of extensions arranged so as to be apart from each other in the circumferential direction of the base, and
   the stepped part is formed in at least one of the extensions.

3. The lens barrel of claim 1, wherein the tooth tip of the inner gear is positioned inside the second member in the radial direction.

* * * * *